US012655354B2

(12) United States Patent
Coleman

(10) Patent No.: US 12,655,354 B2
(45) Date of Patent: *Jun. 16, 2026

(54) FEEDSTOCK PROCESSING METHOD AND SYSTEM

(71) Applicant: DEFUGO TECHNOLOGIES PTE LTD, Singapore (SG)

(72) Inventor: David Coleman, Singapore (SG)

(73) Assignee: DEFUGO TECHOLOGIES PTE LTD, Singapore (SG)

( * ) Notice: Subject to any disclaimer, the term of this patent is extended or adjusted under 35 U.S.C. 154(b) by 1007 days.

This patent is subject to a terminal disclaimer.

(21) Appl. No.: 17/773,480

(22) PCT Filed: Nov. 23, 2021

(86) PCT No.: PCT/IB2021/060839

§ 371 (c)(1),
(2) Date: Apr. 29, 2022

(87) PCT Pub. No.: WO2022/107099

PCT Pub. Date: May 27, 2022

(65) Prior Publication Data

US 2023/0151278 A1 May 18, 2023

(30) Foreign Application Priority Data

Nov. 23, 2020 (AU) ................................ 2020904315
Dec. 3, 2020 (AU) ................................ 2020904477
Aug. 24, 2021 (AU) ................................ 2021221469

(51) Int. Cl.
B01D 11/00 (2006.01)
B01D 11/02 (2006.01)
(Continued)

(52) U.S. Cl.
CPC .......... *C10B 53/02* (2013.01); *B01D 11/0207* (2013.01); *B01D 11/0226* (2013.01);
(Continued)

(58) Field of Classification Search
CPC . B01D 11/0207; B01D 2011/002; B09B 3/35; B09B 3/80
See application file for complete search history.

(56) References Cited

U.S. PATENT DOCUMENTS 3,986,951 A * 10/1976 Fremont .............. D21C 9/1026
204/542
5,718,939 A * 2/1998 Nugent .................... A23B 7/08
426/639
(Continued)

FOREIGN PATENT DOCUMENTS

CN 107149153 A * 9/2017 .............. A23N 5/00
JP 2004218150 A * 8/2004
(Continued)

OTHER PUBLICATIONS

Jiang, Wei—CN 107149153 A Fit Translation—Sep. 12, 2017 (Year: 2017).*
(Continued)

*Primary Examiner* — Bradley R Spies
(74) *Attorney, Agent, or Firm* — Buchanan Ingersoll & Rooney PC

(57) ABSTRACT

The invention relates to a process, method and devices for recovery of products from a feedstock such as an organic, non-organic or biodynamic feedstock. The products include consumables such as high nutrition foods, nutraceuticals and bioactive compounds and/or non-consumables such as energy and synfuels. The invention typically includes real-time process optimisation. The devices include a counter current diffusion extractor and a decorticator for deriving
(Continued)

useful products from a feedstock, optionally for consumption in further processing.

15 Claims, 17 Drawing Sheets

(51) Int. Cl.

| | |
|---|---|
| *B09B 3/35* | (2022.01) |
| *B09B 3/40* | (2022.01) |
| *C10B 53/02* | (2006.01) |
| *D01B 1/14* | (2006.01) |
| *G05B 19/418* | (2006.01) |
| *B09B 101/70* | (2022.01) |

(52) U.S. Cl.
CPC ............ *B01D 11/0288* (2013.01); *B09B 3/35* (2022.01); *B09B 3/40* (2022.01); *D01B 1/14* (2013.01); *G05B 19/4183* (2013.01); *G05B 19/41835* (2013.01); *B01D 2011/002* (2013.01); *B09B 2101/70* (2022.01)

(56) References Cited

U.S. PATENT DOCUMENTS

| | | | |
|---|---|---|---|
| 2009/0125906 A1 | 5/2009 | Moore et al. | |
| 2009/0158663 A1* | 6/2009 | Deluga | C10J 3/463 |
| | | | 48/209 |
| 2020/0074307 A1 | 3/2020 | Kent et al. | |

FOREIGN PATENT DOCUMENTS

| | | | | |
|---|---|---|---|---|
| WO | WO-0020667 A1 * | 4/2000 | ............... | D01B 1/22 |
| WO | WO-2011035381 A1 * | 3/2011 | ............ | C13B 10/02 |
| WO | 2019071361 A1 | 4/2019 | | |
| WO | WO-2020087127 A1 * | 5/2020 | ............... | B01D 3/38 |

OTHER PUBLICATIONS

Kawamura et al—Jp 2004218150A Fit Translation—Aug. 5, 2004. (Year: 2004).*

Kim et al., "Robust Batch-to-Batch Optimization with Scenario Adaptation", Industrial & Engineering Chemistry Research, 2019, vol. 58, pp. 13664-23674.

Abbasi et al., "Characterization and stochastic modeling of uncertainties in the biodiesel production", Clean Techn Environ Policy (2014) 16, pp. 79-94.

Bonvin et al., "Dynamic optimization in the batch chemical industry", AlChE Symposium Series No. 326, vol. 98, Chemical Process, Control-VI, Proceedings of the Sixth International Conference on Chemical Process Control, Tucson, Arizona, Jan. 7-12, 2001, pp. 255-273.

International Search Report and Written Opinion for International Application No. PCT/IB2021/060839, dated Feb. 22, 2022, 14 pages.

* cited by examiner

Forward to FIG 5B

FIG 10A

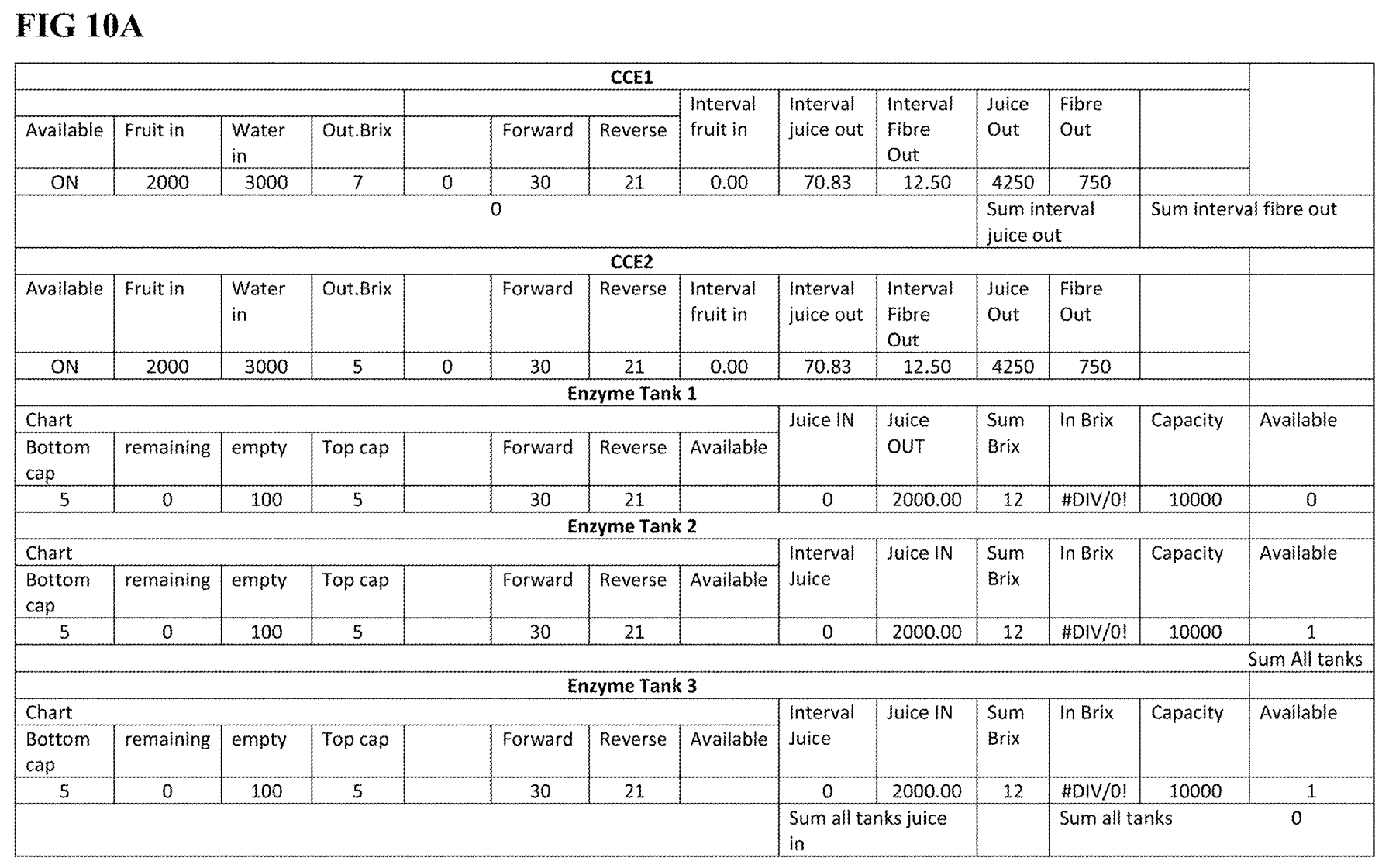

CCE1

| Available | Fruit in | Water in | Out.Brix | | Forward | Reverse | Interval fruit in | Interval juice out | Interval Fibre Out | Juice Out | Fibre Out |
|---|---|---|---|---|---|---|---|---|---|---|---|
| ON | 2000 | 3000 | 7 | | 30 | 21 | 0.00 | 70.83 | 12.50 | 4250 | 750 |

Sum interval juice out / Sum interval fibre out: 0

CCE2

| Available | Fruit in | Water in | Out.Brix | | Forward | Reverse | Interval fruit in | Interval juice out | Interval Fibre Out | Juice Out | Fibre Out |
|---|---|---|---|---|---|---|---|---|---|---|---|
| ON | 2000 | 3000 | 5 | | 30 | 21 | 0.00 | 70.83 | 12.50 | 4250 | 750 |

0

Enzyme Tank 1

| Chart | Bottom cap | remaining | empty | Top cap | | Forward | Reverse | Available | Juice IN | Juice OUT | Sum Brix | In Brix | Capacity | Available |
|---|---|---|---|---|---|---|---|---|---|---|---|---|---|---|
| | 5 | 0 | 100 | 5 | | 30 | 21 | | 0 | 2000.00 | 12 | #DIV/0! | 10000 | 0 |

Enzyme Tank 2

| Chart | Bottom cap | remaining | empty | Top cap | | Forward | Reverse | Available | Interval Juice | Juice IN | Sum Brix | In Brix | Capacity | Available |
|---|---|---|---|---|---|---|---|---|---|---|---|---|---|---|
| | 5 | 0 | 100 | 5 | | 30 | 21 | | 0 | 2000.00 | 12 | #DIV/0! | 10000 | 1 |

Enzyme Tank 3

| Chart | Bottom cap | remaining | empty | Top cap | | Forward | Reverse | Available | Interval Juice | Juice IN | Sum Brix | In Brix | Capacity | Available |
|---|---|---|---|---|---|---|---|---|---|---|---|---|---|---|
| | 5 | 0 | 100 | 5 | | 30 | 21 | | 0 | 2000.00 | 12 | #DIV/0! | 10000 | 1 |

Sum all tanks juice in: 0

Sum all tanks juice / Sum all tanks / Sum All tanks: 0

FIG 10B

Enzyme Tank 4

| Chart | Bottom cap | remaining | empty | Top cap | Forward | Reverse | Available | Interval juice | Juice IN | Sum Brix | In Brix | Capacity | Available |
|---|---|---|---|---|---|---|---|---|---|---|---|---|---|
| | 5 | 0 | 100 | 5 | 30 | 21 | | 0 | 2000.00 | 12 | #DIV/0! | 10000 | 1 |

Enzyme Tank 5

| Chart | Bottom cap | remaining | empty | Top cap | Forward | Reverse | Available | Interval Juice | Juice IN | Sum Brix | In Brix | Capacity | Available |
|---|---|---|---|---|---|---|---|---|---|---|---|---|---|
| | 5 | 0 | 100 | 5 | 30 | 21 | | 0 | 2000.00 | 12 | #DIV/0! | 10000 | 1 |

Sum All tanks

Enzyme Tank 6

| Chart | Bottom cap | remaining | empty | Top cap | Forward | Reverse | Available | Interval Juice | Juice IN | Sum Brix | In Brix | Capacity | Available |
|---|---|---|---|---|---|---|---|---|---|---|---|---|---|
| | 5 | 0 | 100 | 5 | 30 | 21 | | 0 | 2000.00 | 12 | #DIV/0! | 10000 | 1 |

Pump Enzyme to Holding Tanks

| Bottom cap | remaining | empty | Top cap | Total juice flow | Reverse | EnzPump Power | Interval output | Interval Out | Sum Brix | In Brix | Pump output speed | | |
|---|---|---|---|---|---|---|---|---|---|---|---|---|---|
| 5 | 0 | 100 | 5 | | 21 | OFF | 0 | 0 | 12 | #DIV/0! | 10000 | ON | OFF |

Evaporator Tank 1

| Chart | Bottom cap | remaining | empty | Top cap | Forward | Reverse | Available | Total juice in | Total juice out | Juice in | Juice out | Capacity | Available |
|---|---|---|---|---|---|---|---|---|---|---|---|---|---|
| | 5 | 0 | 100 | 5 | 0 | 21 | | 0 | 0 | 0 | #DIV/0! | 7500 | 1 |

FIG 10C

Evaporator Tank 2

| Chart | Bottom cap | remaining | empty | Top cap | Tank Balance | Available | Total juice in | Total juice Out | Sum Brix | In Brix | Capacity | Available |
|---|---|---|---|---|---|---|---|---|---|---|---|---|
| | 5 | 0 | 100 | 5 | 0 | | 0 | 0 | 0 | #DIV/0! | 7500 | 1 |

Evaporator

| Chart | Bottom cap | remaining | empty | Top cap | Total juice in | Total juice out | Total water out | Interval juice in | Interval Juice Out | Interval water out | Brix OUT | Brix IN | Evaporator Speed | Start |
|---|---|---|---|---|---|---|---|---|---|---|---|---|---|---|
| | 5 | 0 | 100 | 5 | 0 | 0 | 0.0 | 0 | 0.0 | 0 | 70 | 6 | 6500 | Start |

Condensate Water Tank

| Chart | Bottom cap | remaining | empty | Top cap | Tank balance | Reverse | Available | Total water in | Total water out | Juice in | Juice out | Capacity | |
|---|---|---|---|---|---|---|---|---|---|---|---|---|---|
| | 5 | 0 | 100 | 5 | 0 | 21 | | | 0 | 0 | 0 | 3000 | ON |

Tank 27

| | Bottom cap | remaining | empty | Top cap | Tank balance | Reverse | Available | Total juice in | Total juice out | Juice in | Juice out | Capacity | |
|---|---|---|---|---|---|---|---|---|---|---|---|---|---|
| | 5 | 0 | 100 | 5 | 0 | 21 | | 0 | 0 | 0 | 0 | 10000 | #DIV/0! |

Tank 28

| Chart | Bottom cap | remaining | empty | Top cap | Tank balance | Reverse | Available | Total juice in | Total juice out | Juice in | Juice out | Capacity | Available |
|---|---|---|---|---|---|---|---|---|---|---|---|---|---|
| | 5 | 0 | 100 | 5 | 0 | 21 | | 0 | 0 | 0 | 0 | 7500 | 1 |

FEEDSTOCK PROCESSING METHOD AND SYSTEM

CROSS-REFERENCE TO RELATED APPLICATIONS

This application is the U.S. National Phase of International Application No. PCT/IB2021/060839, filed Nov. 23, 2021, which claims priority to Australian Application Nos. AU 2020904315, filed Nov. 23, 2020, AU 2020904477, filed Dec. 3, 2020 and AU 2021221469, filed Aug. 24, 2021, the disclosures of each of these applications being incorporated herein by reference in their entirety for all purposes.

FIELD OF INVENTION

The present invention relates to the field of feedstock processing, particularly biomass processing.

More particularly, the present invention relates to the field of processing organic, non-organic and/or biodynamic feedstock into components.

The components comprise a wide range of substances such as for example, high nutrition food, health products, juices, water, energy, fuels, building materials, lipids, pharmaceuticals, nutraceuticals and bioactive compounds. The consumable components may undergo further processing to provide useful dosage forms such as tablets, edible liquids, and powders. The non-consumable components may undergo further processing to provide valuable products such as synfuels.

While the present invention will be described with substantial reference to the food processing industry, it will be readily apparent to the skilled person that the invention is not limited to that industry but has applicability to a wide range of other industries that use an organic, non-organic and/or biodynamic feedstock. Furthermore, while the present invention will also be described with reference to recovery of products that are consumable, it will be readily apparent to the skilled person that the invention is not so limited but can be used to isolate other products such as fuels.

BACKGROUND TO THE INVENTION

Industries that rely on a constant supply of feedstock, such as the food processing industry, generate billions of kilograms of organically rich wastes per year. The waste includes nutrient, carbonaceous and nitrogenous processing waste discharges, unused feedstock and waste packaging. Food processing wastewater is often processed, but processing is complex and costly because of the contaminant loadings and the wide variability of the types of wastewater generated in a processing plant. Disposing or storing waste generated by the industry presents enormous economic and environmental challenges.

The majority of the waste ends up in landfill or is applied to land where it decomposes and releases carbon dioxide and methane. As a result, the food processing industry is the third largest contributor to global greenhouse gas production.

Feedstock processing industries are making efforts to minimize waste generation. For example, efforts have been made, to compost organic waste, to recycle processing and packaging materials, and to save energy and water during processing. The focus on reduction, reuse and recycling is a key part of waste management strategy in, for example, the food processing industry. The food processing industry seeks efficient and economical ways of managing waste without discharging harmful, odorous or objectionable pollutants.

The food processing industry is also under pressure to improve processing performance and efficiencies while being environmentally responsible. This must be balanced against the high consumer expectations that the food produced is safe, wholesome, and affordable. Efficiencies are often sought in production management and fulfillment across the supply chain from growers, transporters, processors, wholesalers and retailers.

An underlying challenge faced by the food processing industry is that it operates on many levels in an "analogue" paradigm. "Digital transformation" is now forcing companies to change their business models and adapt to the new market reality that is basically being driven by customer demands and expectations.

Digital transformation is the integration of digital technology into all areas of a business, resulting in fundamental changes in business operation and the value delivered to their customers. Achievable outcomes for the food industry through digital transformation include quality control across the supply chain, enhanced production efficiency and timely, targeted delivery. Improved insights are sought to span predictive analytics of customer behaviour and to provide real time optimization of production of products at plant. Big data insights can help a farmer grow plants in response to demand, adjust to customer buying patterns. At the processing plant, the ability to optimize production yields and constantly refine quality of specific targeted products and recipes will impact the top and bottom line for the food processing industry.

The food processing industry is also exploring various ways to improve its energy efficiency to reduce energy costs, carbon emissions, and negative environmental impacts. Energy management systems (EMS) are being widely implemented in the food processing industry to achieve and sustain energy usage improvements. Energy management in the food processing industry is complicated with various competing parameters such as energy production, energy import/export, energy storage, energy conversion, energy transmission, and energy consumption. This situation is further complicated by other uncertain parameters (i.e., interval, possibility, and probabilistic distributions) that are inherent in analogue based machinery (dumb devices) of the prior art and components that are major parts of most food production facilities. Hence, to improve the energy efficiency in food processing, there is a need for a system which provides a detailed real-time energy usage breakdown for food production facilities.

The paradigm shift of digital transformation and use of the Internet of Things (IoT)-based energy smart meters can improve energy consumption. Smart meters open the door to many things including the provision of critical information on energy consumption levels of various food processing facilities, thereby allowing managers to make better decisions in real-time to reduce overall energy usage. IoT-based smart energy systems can help to reduce energy wastage and are part of whole plant utilization, waste reduction, quality improvement and increase in the quantity of useable extracted elements.

Thus, there is a need for improved processing of organic, non-organic and biodynamic feedstocks with reduced waste. There is also a need for feedstock processing having improved production efficiency in terms of conversion of feedstock to its components or downstream products.

Throughout this specification the use of the word "inventor" in singular form may be taken as reference to one (singular) inventor or more than one (plural) inventor of the present invention.

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art before the priority date of the disclosure and claims herein.

It is an object of the embodiments described herein to overcome or alleviate at least one of the above noted drawbacks of related art systems or to at least provide a useful alternative to related art systems.

DESCRIPTION OF THE INVENTION

In one aspect, the present invention provides a process for the recovery of products from a feedstock. Other aspects of the present invention include but are not limited to: capture and recordal of information concerning a feedstock at one or more steps of the process; optionally washing the feedstock prior to processing; recipe optimization; information management; regulation of counter current extraction; isolation and/or purification of products produced by the process. Yet further aspects of the present invention include, but are not limited to use of counter current diffusion and decortication at one or more steps of the process.

Other aspects and preferred forms are disclosed in the specification and/or defined in the appended claims, forming a part of the description of the invention.

In a first aspect there is provided a process for recovery of products from a feedstock, the process comprising the steps of:

receiving a feedstock;

recording a profile of the feedstock in a database associated with a processor;

optionally washing the feedstock;

providing real-time feedstock information to the processor for optimisation of a pre-loaded recipe program for separating the feedstock into components;

separating the feedstock into components, according to machine readable recipe program instructions provided by the processor, the instructions being based on the profile and the real-time feedstock information;

wherein the components separated include one or more of liquids, solids, fibre, terpenes, polyphenols, minerals, proteins or combinations thereof.

In a second aspect of the present invention there is provided a process for washing a feedstock, the method comprising the steps of:

providing an electrolysis cell having a single cell containing an anode and a cathode and brine electrolyte, passing an electric current from the cathode to the anode to produce a free chlorine solution including HOCl wherein the solution pH is between 5 and 7, and applying the solution to the feedstock.

Preferably the process for washing a feedstock is a step within the process for recovery of products from a feedstock according to the present invention.

In a third aspect of the present invention there is provided a method for real-time optimisation of processing a feedstock, the method comprising the steps of:

preloading a recipe program on a processor, the recipe program including machine readable recipe program instructions for process control settings;

recording a digitised profile of the feedstock in a database associated with the processor; recording feedstock information and providing said information to the processor;

performing real-time adjustment of the machine readable recipe program instructions based on the digitised profile and/or the feedstock information;

wherein an Efficiency Digital Algorithm calculates adjustments to be applied to the machine readable recipe program instructions based on the digitised profile and/or feedstock information; and the adjusted machine readable recipe program instructions are applied to the process control settings.

Preferably the process of real-time optimisation of feedstock processing is a step within the process for recovery of products from a feedstock according to the present invention.

In a fourth aspect of the present invention there is provided a system for recovery of products from a feedstock, the process comprising:

a feedstock processing arrangement operable to perform a number of feedstock processing steps according to a recipe program;

an apparatus which is in communication with the feedstock processing arrangement and configured for process control of the feedstock processing steps; and multiple sensors associated with the feedstock processing arrangement and adapted to transmit a feedstock profile and feedstock information to the apparatus;

the apparatus comprising:

a memory unit for storing a recipe program that comprises a list of machine readable recipe program instructions for process control of feedstock processing steps, wherein the list of machine readable recipe program instructions comprises command instructions that each allocates a respective feedstock processing step to a predefined control command among a set of predefined control commands;

an electronic warehouse comprising databases for storing the feedstock profile and feedstock information;

a processor for performing real-time adjustment of the machine readable recipe program instructions in response to feedstock profile and feedstock information from the databases;

wherein the feedstock profile and feedstock information are input to an Efficiency Digital Algorithm for calculation of the adjustments to the machine readable recipe program instructions and optimisation of the process control command, prior to sequentially executing the machine readable recipe program instructions in the list of instructions.

In a fifth aspect of the present invention there is provided a device for counter current diffusion extraction (CCE), the device comprising:

an elongate housing having an inlet adjacent a first end and an outlet adjacent a second end, the longitudinal axis of the housing being inclined upwardly from the first end to the second end;

a rotatable screw conveyor having at least one substantially helical flight disposed within the housing and rotatable about its longitudinal axis for moving feedstock to be extracted from the inlet to the outlet;

an inlet chamber located adjacent the inlet such that feedstock to be extracted can be introduced through the inlet to the rotatable screw conveyor;

a means for introducing an extracting liquid into the housing such that the extracting liquid flows down the housing and in counter current with the feedstock being extracted; and a means for withdrawing liquid extracted from the feedstock and returning the liquid into the housing such that the returned liquid contacts the feedstock being extracted.

Optionally, the inlet chamber is an airlock chamber comprising an airtight vessel having an openable top side and an openable floor.

Optionally, the device further includes a pump for reducing pressure within the housing and/or the airlock chamber.

Preferably the device for counter current extraction is used to perform a feedstock processing step in the process for recovery of products from a feedstock according to the present invention.

In a preferred embodiment the feedstock is processed into one or more products chosen from terpenes, wet fibre, dry fibre, retentate minerals, proteins, polyphenols or juice (in the form of consumable liquid from plant material). In one form of the process of the present invention two or more of the aforementioned products are (re)-combined by counter current infusion (CCI).

In another embodiment of the present invention the device for counter current extraction is used for processing at least some feedstock from a prior art process.

In a sixth aspect of the present invention there is provided a decorticator for deriving useful products from feedstock, preferably long stalk biomass, the decorticator including;

a pair of rotating sizing members adapted to size the feedstock passed therebetween, a cutting head for cutting the feedstock, a first rotating cutting member for removing a first product comprising hurd from the feedstock using a rotating cutting member, a second rotating cutting member for removing a second product comprising bark from the feedstock, the remaining bast comprising a third product, and separate outlets for each of the first product, the second product and the third product.

Preferably the decorticator is used to perform a feedstock processing step in the process for recovery of products from a feedstock according to the present invention.

In a seventh aspect of the present invention, there is provided a decortication process for deriving useful products from feedstock comprising hurd, bark and bast, includes the steps of;

sizing long stalks of the feedstock, cutting the stalks of feedstock, preferably longitudinally, generating a first product comprising hurd from the biomass using a rotating cutting member, generating a second product comprising bark from the biomass using a rotating cutting member, and generating a third product comprising bast.

The products of the decorticator or decortication device may provide one or more of bark, hurd and bast to any one or more of the aforementioned processes, devices or systems that consume or produce feedstock.

In an eighth aspect of embodiments described herein there is provided a system for recovery of products from a feedstock, preferably long stalk biomass, the process comprising:

a decorticator operable to perform a number of feedstock decortication steps according to a program, an apparatus which is in communication with the decorticator and configured for process control of the feedstock processing steps, and multiple sensors associated with the decorticator and adapted to transmit decorticator information and feedstock information to the apparatus, the apparatus comprising:

a memory unit for storing a feedstock decortication program that comprises a list of machine-readable feedstock decortication program instructions for process control of feedstock decortication steps, wherein the list of machine-readable feedstock decortication program instructions comprises command instructions that each allocates a respective feedstock decortication step to a predefined control command among a set of predefined control commands, an electronic warehouse comprising databases for storing the feedstock profile and feedstock information, a processor for performing real-time adjustment of the machine-readable feedstock decortication program instructions in response to decorticator information and feedstock information from the databases, wherein the decorticator information and feedstock information are input to an Efficiency Digital Algorithm for calculation of the adjustments to the machine-readable feedstock decortication instructions and optimisation of the process control command, prior to sequentially executing the machine-readable feedstock decortication program instructions in the list of instructions.

The aforesaid system may further comprise a device for counter current diffusion extraction according to the present invention wherein the decorticator produces one or more of bark, hurd or bast which is passed into the device and subjected to counter current diffusion extraction.

In a ninth aspect of embodiments described herein there is provided a system for processing a feedstock, the system comprising a decorticator and a counter current extractor according to the present invention, a press, and a dryer, wherein:

(i) the feedstock is passed through the decorticator and separated into bast, hurd and bark; and (ii) at least one of the bast, hurd and bark is feedstock for the counter current extractor, The pressed, dried hurd and/or bark may undergo a subsequent pyrolysis step to produce one or more of tar, wood vinegar (pyroligneous acid), hydrogen and biochar. The pressed dried bast is more typically stored.

The pressed, dried hurd and/or bark may undergo a subsequent pyrolysis step to produce one or more of tar, wood vinegar (pyroligneous acid) and biochar.

Typically, the feedstock is detrashed prior to being fed into the above system, the trash in the form of leaves and other plant detritus may be subjected to further processing.

The present invention arises from the realisation that real time optimization of feedstock processing based on feedstock data can provide substantial improvement in process efficiency and concomitant reduction of waste. Optimally, waste may be almost eliminated, with the entire feedstock processed to provide valuable products.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which:

FIG. 10 (comprising FIG. 10A, FIG. 10B and FIG. 10C) illustrates a control sheet showing operational control parameters for the processing system illustrated in FIG. 8;

LIST OF PARTS (FIG. 7)

| | | | |
|---|---|---|---|
| 1 | Airlock Chamber | 2 | Sealable hinged lids |
| 3 | Motors and instruments | 4 | (internal) Screen support attached to CCE Shaft |
| 5 | Ball valves from header pipe to jacket | 6 | Lifting lug for cranes |
| 7 | Discharge port in front of internal screen | 8 | Recycle juice heat exchanger inlet |
| 9 | Hot water jacket on trough body | 10 | CCE removable and adjustable cutting head to single screw blade |
| 11 | Adjustable diffusion spaced entry point | 12 | Rails for moving cutter into place |
| 13 | Adjustable diffusion spaced entry point | 14 | Hot water or steam header pipe for jacket panels |
| 15 | CCE vacuum enablement for terpene recovery | 16 | Enlarged solids discharge point |
| 17 | Double actuating ram to open the CCE | 18 | Hydraulic lift agitation control unit |

-continued

| | | | |
|---|---|---|---|
| 19 | External bearing | 20 | Double gate valve hydraulic pneumatic discharge point |
| 21 | Triclamp for temperature probe to measure solvent temperature | 22 | Fibre cutting unit (for preparing fibre for a subsequent processing stage) |

LIST OF PARTS (FIG. 11)

| | | | |
|---|---|---|---|
| 31 | Chute | 32 | Sizing wheels |
| 33 | Gripping area | 34 | Cutting head |
| | | 36 | First guide wheels |
| 37 | Inner passage | | |
| | | 40 | First cutting wheel |
| 41 | First transport wheel | 42 | Second cutting wheel |
| 43 | Second transport wheel | | |
| 45 | Outer casing | 46 | Pivot pin |
| 47 | Inner frame | 48 | Second guide wheel |

LIST OF PARTS (FIG. 8)

| | | | |
|---|---|---|---|
| 50 to 58 | Valves | 61 | Valve for hot water supply |
| 62 | Valve for cold water supply | 63 | Valve for hot water return |
| 64 | Valve for cold water return | 70 to 74 | Variable controls |
| 80, 81, 82 | Flow Transmitters | 90 to 94 | Motor pumps |
| 100, 101, 102 | Manifolds | 103 | Finisher |
| 110 | Lid of screw housing | 111 | Trough of screw housing |
| 112 | Screw auger | 120 to 123 | Temperature transmitter |
| 124, 125 | Level sensor | 150 | Balance tank |

DETAILED DESCRIPTION OF THE INVENTION

Process

Figure 1:
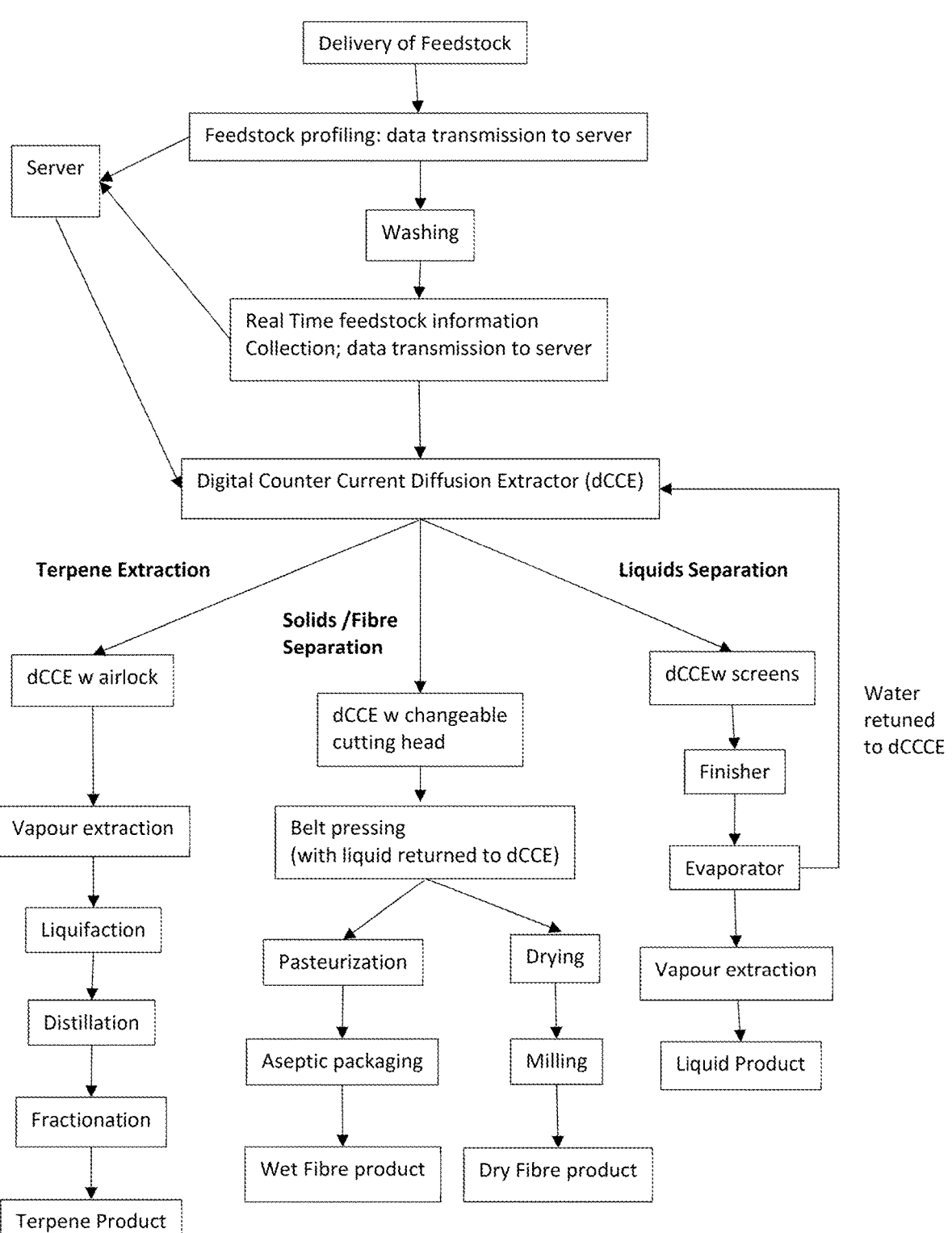
FIG. 1 illustrates the steps associated with a process of the present invention leading to extraction of terpenes and separation of solids/fibres and liquids.

The first aspect of the present invention provides a process for the recovery of components from a feedstock. Preferably the process of the present invention transforms the feedstock into components with minimal or preferably, no waste. The process of the invention is described in the following paragraphs and is illustrated by the flow chart of FIG. 1 which illustrates the main process steps from delivery of feedstock to the extraction of terpenes and separation of solids/fibres and liquids.

Preferably the feedstock is a food source. More preferably, the food source is a plant or is derived from a plant and may comprise organic, non-organic and/or biodynamic materials. This includes food sources such as sugarcane, sugar beet, cocoa beans and coffee beans. Most preferably, the food source is selected from the group consisting of apples, oranges, pears, and pineapples.

Preferably, the components recovered from the feedstock are selected from any one or more of liquids, solids, fibre, terpenes, polyphenols, minerals, proteins or combinations thereof. Depending on the type of feedstock, exemplary polyphenols include terpenes. Depending on the identity of the feedstock, exemplary liquids include sugar, lignin and cellulose. Depending on the identity of the feedstock, exemplary solids include dietary fibre and non-dietary fibre.

More preferably, the components recovered are selected from any one or more of: high nutrition food, health products, juices, water, energy, fuels, building materials, lipids, pharmaceuticals, nutraceuticals and bioactive compounds. The consumable components may undergo further processing to provide useful dosage forms such as tablets, edible liquids, and powders. The non-consumable components may undergo further processing to provide valuable products such as synfuels.

Feedstock Profiling

Feedstock is typically transported to a food processing facility by road, rail or waterway. Each feedstock lot is associated with historic information relating to its identification, origin and treatment.

Upon arrival at the food processing facility, the historic information for each feedstock lot is captured to create a profile of the feedstock lot that is recorded in a database prior to feedstock processing.

The information may be captured by any convenient sensor, such as a scanner. In a particularly preferred embodiment, a scanner is used to read a standard machine readable optical label such as a barcode or a matrix barcode (Quick Response) QR code. This digitized information may include, certificates, sprays, spray charts, fertilizers and pesticides relevant to each specific lot of feedstock. The captured information may be relayed to a relevant apparatus such as a database server, or any other automated high-performance database management system within or outside the facility.

Optionally, the feedstock profile may be used as a data reference point during real-time recipe optimization as described below.

Sensors

The feedstock lot is then scanned to record physical parameters. Preferably, the feedstock is scanned upon receipt at a processing facility using an "Internet of Things" (IoT) based sensor configured with industry standard technology. The IoT is typically a system of interrelated computing devices, mechanical and digital machines provided with unique identifiers and the ability to transfer data over a network without requiring human intervention. Some examples of vendors that can provide components that contribute to facilitating this infrastructure capability include companies well known to those skilled in the art, such as Allen Bradley, Schneider Electric, Rockwell Automation, Berthold Technologies, Mettler Toledo, Hydronix, BB Sensors and Calex amongst the many companies capable of supplying innovative sensor technology to support custom configurations of systems in food processing plants around the world.

Where used herein the term 'sensor' is intended to refer to a device which detects or measures a physical property and indicates, records, transmits or otherwise responds. Throughout this specification reference will be made to a range of sensors associated with feedstock processing, including but not limited to sensors associated with feedstock arrival, preparation for processing, processing, quality control, packaging, storage and shipment. The sensors may be commercially available and/or customised for intended purpose.

For example, the method or process of the present invention may include moisture measurement sensors, which are commercially available in many and varied forms. Several high temperature microwave sensors in the market are designed for use in respect of liquids such as concentrates, solutions or any process where the level of moisture or dissolved solids requires measurement. This allows for both control quality and reduction of waste when manufacturing powdered products. These types of sensors are all manufactured from materials that are safe for food contact enabling installation in food production or similar environments. They can be used to measure in an evaporator when reducing liquids to determine when a target level has been reached. This enables precise timing for the liquid to be discharged. These sensors may also be used in any process where an exact measurement of moisture in a liquid is required. The sensors rapidly detect changes in moisture levels enabling real time adjustments to be made during processing ensuring the ability to produce a consistent product.

A range of sensors have been designed to specifically dissolved solids in sugar processed applications relative to the Brix scale. Brix measurement (or Brix scale) is well known in the food and beverage industry, amongst others. According to the Brix scale of measurement, 1 degree Brix ($° Bx$)=lg of sucrose/100 g of solution which is equal to 1% Brix. Using advanced digital microwave measuring techniques, the water content of a syrup or massecuite can be precisely measured and the degrees Brix measurement derived. Other types of sensors for measurement of physical parameters include hydrometers, pycnometers, brix meter/refractometer and digital density meters.

Inclinometer tilt sensors allow for precise angle measurement of pitch and roll and are very suitable for both monitoring for levelling a platform or making angular adjustments. Preferred tilt sensor manufactures base their technology on micro-electromechanical systems (MEMS). MEMS is a process technology used to create tiny integrated devices or systems that combine mechanical and electrical components. They are fabricated using integrated circuit batch processing techniques and can range in size from a few micrometres to millimetres.

Non-contact infrared temperature sensors are ideally suited for use in food processing and manufacturing industries because they can be used without contaminating or disturbing the product. These sensors have a very fast response time and can accurately measure the surface temperature of food substances moving on a conveyor belt, in vats and holding tanks along the production process. In many food processing applications, the process and product temperature are important physical parameters. Contactless temperature measurement with an infrared sensor system is a very powerful method for monitoring and managing these processes.

Exemplary information that may be captured and recorded in a digitised profile prior to processing of the feedstock may include any one or more of:

a) degrees brix ($° Bx$);

b) water content;

c) fibre content;

d) size before allocation to holding bin; and e) weight before allocation to holding bin.

The captured information may be relayed to a database within or outside the processing facility. Optionally, the captured information may be used as a data reference point during "real-time recipe optimization" as described below.

Feedstock Inspection

Following delivery, collection of profile information and other information, the feedstock lot is typically allocated to an appropriate holding facility, such as a bin or hopper. The feedstock is called forward to the processing arrangement as required, the rate of call forward being controlled by the method and system of the present invention.

The feedstock proceeds to an inspection table where it is subjected to a scan to detect foreign material, such as produce identification stickers, and detritus such as twigs and leaves. The foreign material is removed by manual or automated means. The feedstock is also subjected to a scan to detect any metal for removal. Other scans may be used to check that the feedstock has been correctly identified, and to detect undesirable chemicals, such as pesticides.

Feedstock Washing

The process of the present invention may further comprise a method for the inspection and washing of the feedstock, prior to the separation stage of the process of the present invention.

The feedstock is washed to remove harmful pathogens. These include chemicals such as pesticides, mould, spores and any other undesirable foreign material. Preferably, the wash step involves the use of a wash solution that does not include toxic chemicals, yet still allows control of pH and suppression of microbial growth. An exemplary wash solution is produced by Tygrus, LLC. The use of such a solution provides an advantage to the inventive process wherein there is a shift from previous processes using hazardous chemicals to one employing a better performing, cost-effective wash method with no acute toxicity.

Alternative wash solutions may comprise stabilized hypochlorous acid (HOCl), which is a powerful oxidant that is effective against pathogens. The majority of the research on HOCl has been in relation to its use directly on food. The US Food & Drug Administration Food Contact Notification 1811 allows for HOCl to be used on raw or processed fruits & vegetables, fish & seafood, meat, poultry and shell eggs at up to 60 ppm.

In industry, there are several commercial prior art methods for producing standard HOCl, usually at the point of use. Standard HOCl is produced with membrane technology using an electrolysis cell having two compartments that are separated respectively into the anode compartment and a cathode compartment. The membranes used in production are typically made from a polymer which only allows positive ions to pass through it toward the cathode compartment. A sodium chloride solution is injected into the anode compartment. The positively charged sodium ions pass through the membrane to the cathode side but the negatively charged chloride ions cannot pass through the membrane. Two solutions are generated, an anolyte and a catholyte. On the anode side, a strongly acidic solution of HOCl, with an oxidation-reduction potential (ORP) greater than 800 mV, is generated. On the cathode side, a strongly alkaline solution of NaOH with an ORP less than −800 is generated. Neither of the generated solutions is stable. Both the anolyte and catholyte seek to return to an equilibrium. Both solutions rapidly lose their ORP.

In a second aspect, the present invention provides a method for washing a feedstock using a stable form of HOCl that is at a near neutral pH. HOCl is a meta-stable molecule. Production of stable HOCl may involve the use of single cell electrolysis and generate only one solution, an anolyte of hypochlorous acid. Such electrolysis cells have a single compartment that contains both the anode and cathode and may or may not be engineered to generate a single solution with an ORP>800. The inventors produce a neutral to acidic, free chlorine solution dominated by HOCl. The HOCl solution is stable and the HOCl molecules are only deactivated when exposed to an organic surface or to oxygen in the air. By removing a traditional chemical wash step the present invention may provide a complete organic and chemical-free food production process. This also eliminates the need for chemical-rich cleaning in plant maintenance that is typically required because of the use of toxic elements in the early wash bay cycles of prior art process facilities.

Separation

In a third aspect of the present invention, the inventive process may further comprise a method for "recipe real-time optimization". Sensors may provide initial input to the optimisation process as the feedstock passes from the washing bay to a separation stage of the process of the present invention. In some embodiments of the present invention, sensors are embedded in a conveyor belt, which carries the feedstock through the processing arrangement, between processing steps.

The sensors, of the types previously described, may capture information related to any one or more of:
a) degrees brix (° Bx);
b) temperature;
b) water content;
c) fibre content;
d) size; and
e) weight.

The process of the present invention provides feedstock components that are required for the process to produce predefined end products. The combination of process steps defines a recipe for product production. Every recipe for production includes process control settings relating to one or more of the following parameters:
a) temperature;
b) extraction;
c) terpene release;
d) time;
e) agitation speed;
f) tilt degree;
g) diffusion agent;
h) volume of produce;
i) volume of diffusion agent;
j) solids extraction efficiency; and
k) cut size of long and short sides of produce.

Figure 5A:
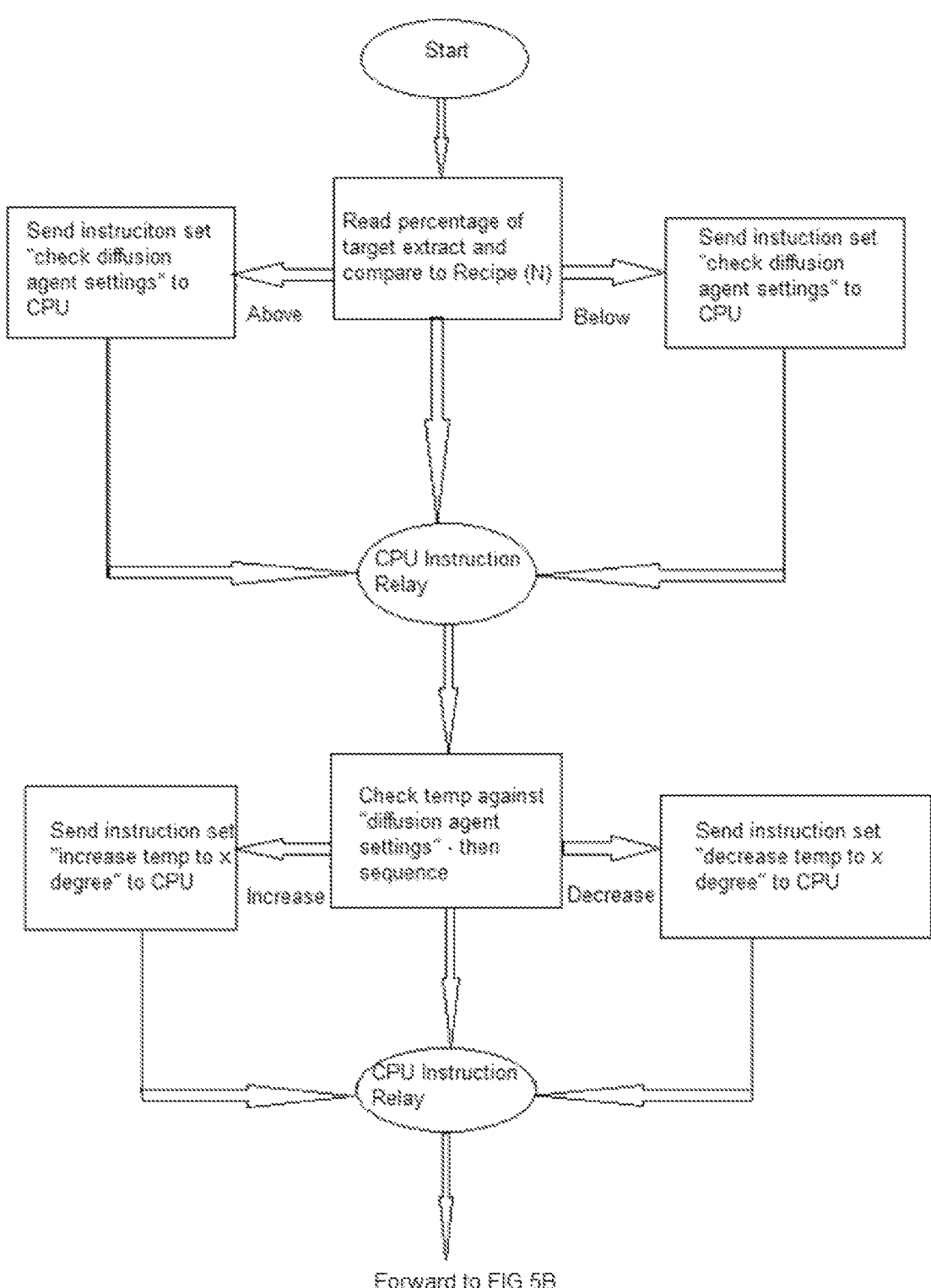
FIG. 5 (comprising FIG. 5A, FIG. 5B and FIG. 5C) illustrates steps associated with "recipe real-time optimisation" of control settings to provide feedstock components as required for the process of the present invention to produce predefined end products.
Figure 5B:
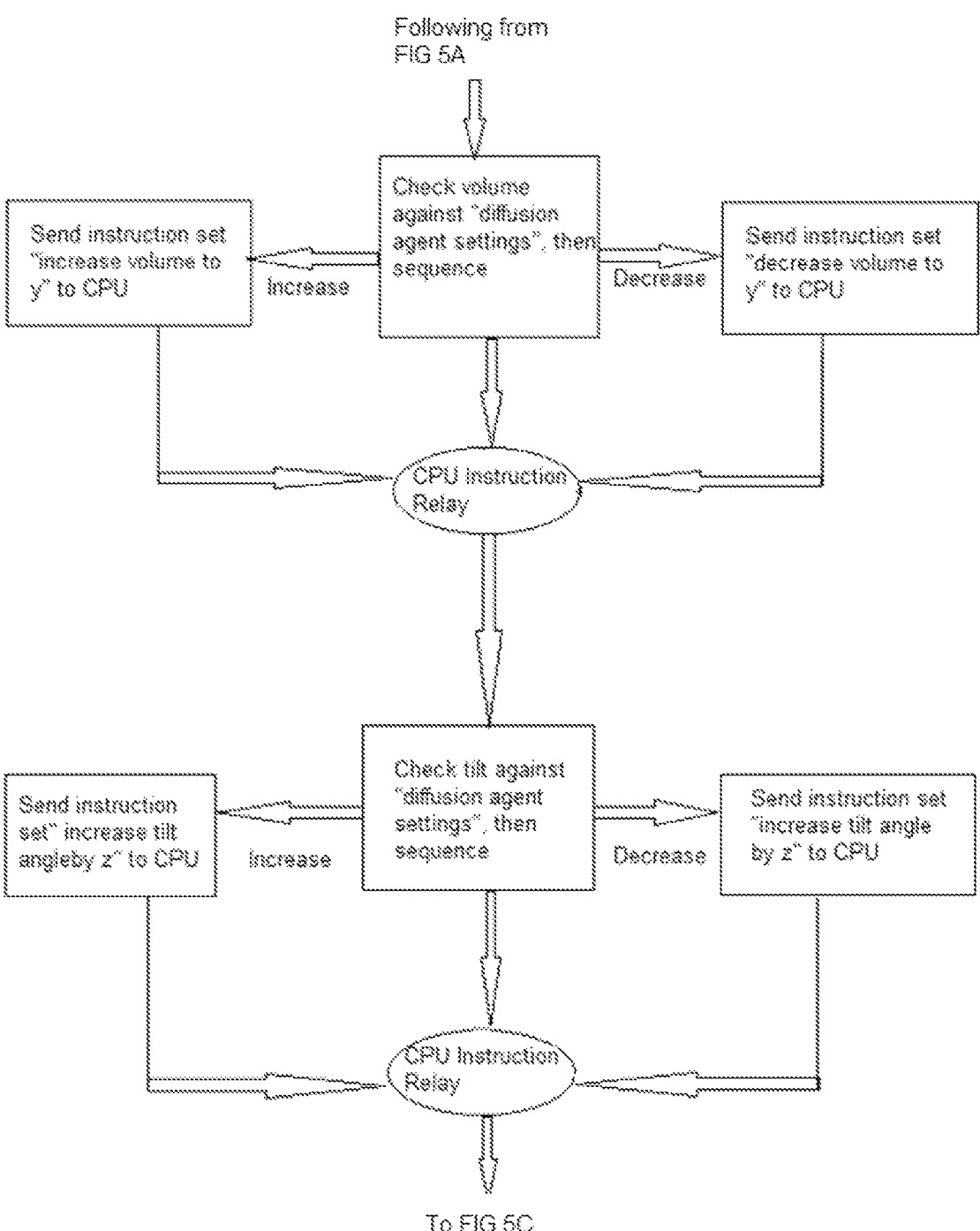
Figure 5C:
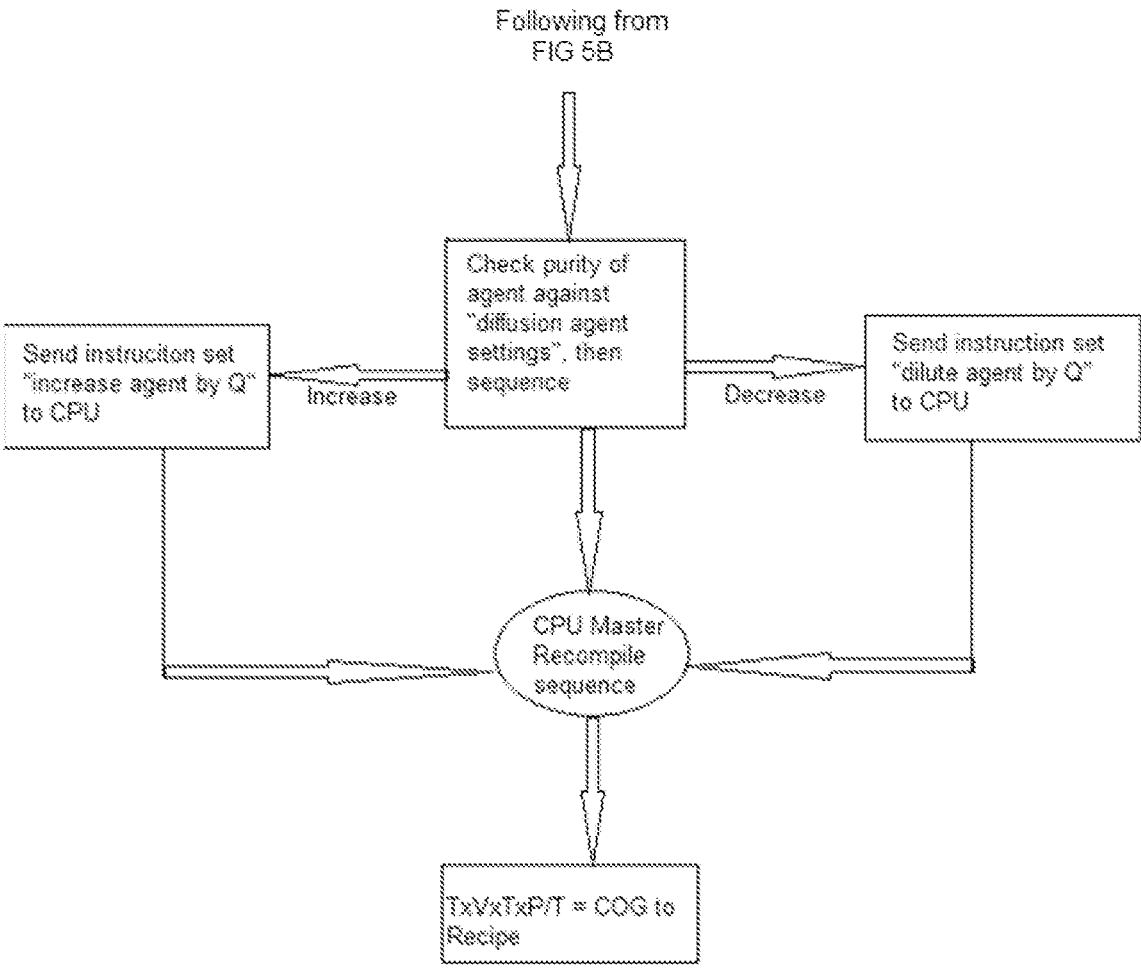

FIG. 5 is a flow chart illustrating the steps involved in recipe real-time optimisation of control settings to provide feedstock components as required for the process of the present invention to produce predefined end products;

Feedstock is transported within a processing arrangement, such as a factory or other facility, by any convenient means. In a fully automated processing arrangement, a conveyor would typically be used for transportation. Preferably, during transportation the value of various feedstock parameters are measured, such as degrees brix (° Bx), water level, fibre level, and/or weight. Measurement of the parameters may be carried out by suitable sensor known in the art as described above.

Real-Time Information Management System (RIMS)

The sensors may be configured to form a sensor network. Artificial intelligence (AI) algorithms may be combined with IoT technology to contribute to operational efficiency of the process of the present invention.

Figure 6:
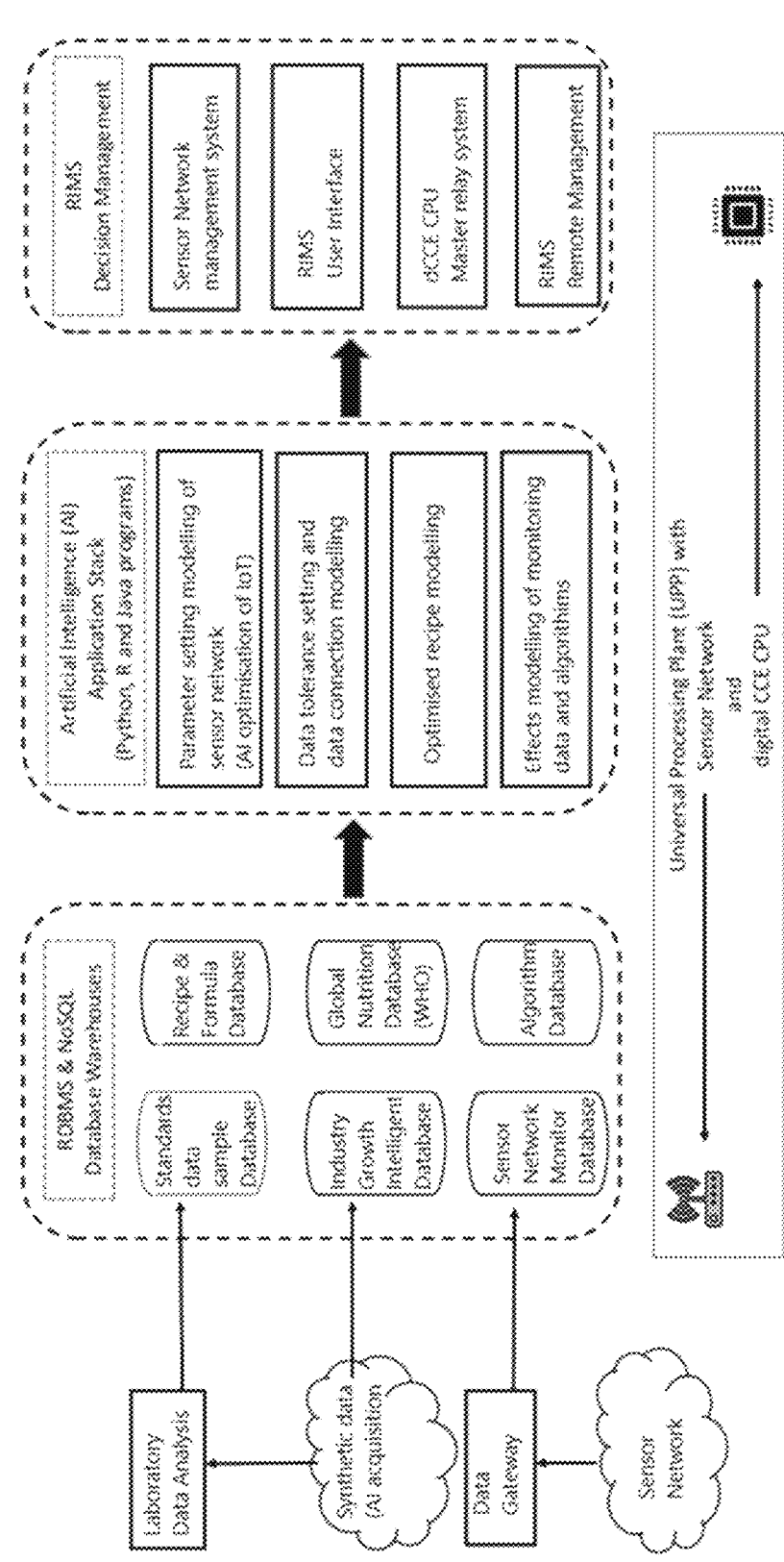
FIG. 6 illustrates the architecture of the system of the present invention, depicting the basic components and subsystems that work together to implement the overall food processing system including a sensor network and dCCE CPU.

FIG. 6 illustrates the architecture of the system of the present invention, depicting the basic components and subsystems that work together to implement the overall food processing system. These include a Sensor Network Monitoring Database (SNMD) sitting in an electronic data warehouse comprising both a Relational Database Management System (RDBMS) and a non-relational Not-Only Structured Query Language (NoSQL) databases. The data warehouse and supporting artificial (AI) application algorithm programs (make up the Real-Time Information Management System (RIMS) of the present invention.

As part of the overall architecture the system can perform functions such as predicting equipment failure, predicting optimised operating conditions and identify parameters to be adjusted during processing to maintain ideal outcomes. Principally, the system achieves this by processing constant streams of data from the sensor network to detect and analyse patterns.

In a preferred embodiment of the system of the present invention, the sensors communicate detected feedstock information via a secure private wireless network to a Sensor Network Monitoring Database (SNMD). This database sits in an electronic data warehouse comprising both a Relational Database Management System (RDBMS) and NoSQL databases. The data warehouse and supporting AI application algorithm programs (that will be described in detail below) make up the Real-Time Information Management System (RIMS) of the present invention.

The data detected by the sensor network is communicated to the sensor network monitoring database (SNMD) for the purpose of real-time updating of the appropriate software and/or generating a response that optimises of the preloaded recipes for the specific batches of feedstock moving through the process of the present invention.

The RIMS comprises a hybrid data warehouse of relational databases that typically retrieves and saves data in a structured format, using rows and columns. There may also be NoSQL ("non-SQL" or "non-relational") databases that are non-tabular, and store data differently than relational tables, such as by storing structured, semi-structured, and unstructured data. NoSQL databases are preferred when dealing with AI applications and huge volumes of data. The flexibility of the data warehouse allows the RIMS system response to be extremely efficient and effective for storing the different data sets that contribute to RIMS.

The data sets include but are not limited to standard sample data sourced from external labs for benchmarking, synthetic data sourced to compile an industry growth intelligent database, global nutrition databases from the World Health Organization (WHO), recipe and formula database, and an algorithm database.

The RIMS may also include an AI Application Stack of programs running on several servers. An application stack is a suite or set of application programs that help to perform certain tasks. These applications are closely linked together, and data can be exported or imported among them with minimum steps. A variety of programming languages may be used to optimize the process of the present invention by embedding artificial intelligence across the IoT stack whenever possible. The programs include but are not limited to parameter setting modelling of the sensor network, data tolerance setting and data connection modelling, optimized recipe modelling, and effects modelling of monitoring data and algorithms.

Each Efficiency Digital Algorithm (EDA) is itself a computer procedure, reflecting the method steps of a recipe. The algorithm starts with the captured sensor network data and captured feedstock profile as inputs. Other inputs to the algorithms include the multiple databases within the data warehouse and outputs of the programs in the AI application stack. The EDA generates a set of outputs, which are in essence the real-time optimal instruction set adjustments of the pre-defined settings of the pre-loaded recipe. The outputs generated are sent to the Counter Current Extractor (CCE) central processing unit (CPU) that will be further described below.

The RIMS typically includes a robust decision management system including but not limited to a Sensor Network management system, RIMS user interface, dCCE CPU Master relay system and a remote RIMS management system.

The generated EDA delivers the real time optimization via the CPU master relay transmission to the CCE onboard CPU.

Figure 4:
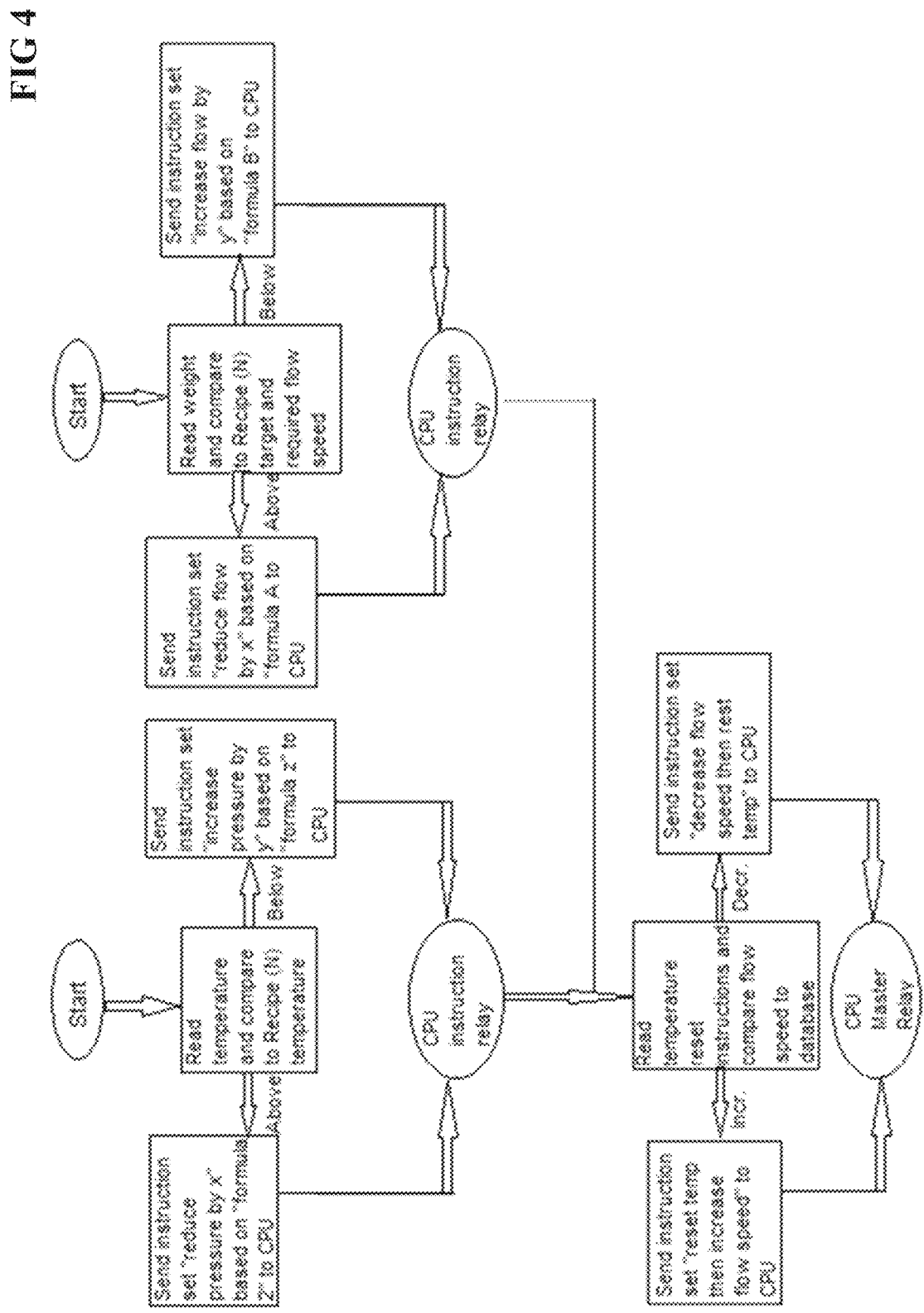
FIG. 4 illustrates a flow chart of a simple example of one of many algorithms executed according to the method and process of the present invention.

A particularly preferred embodiment of the computerised procedure is depicted in FIG. 4. In this embodiment the parameter setting modelling program calls the data set from the sensor network monitoring database. In parallel, the recipe optimization modelling program calls the data sets from the warehouse that include a combination of the standards data sample, the recipe and formula and the global nutrition databases. The output of these programs feeds the effects modelling of monitoring data and algorithms program that calls the data set from the algorithm database and produces the Efficiency Digital Algorithm (EDA) specific to the optimization of the recipe in production at that time.

The instruction set is passed by the program to the RIMS Decision Management stream where the command set is communicated by the dCCE CPU master relay system to the onboard CPU on the CCE. All of this can be monitored by the with the RIMS user interface in the plant operations room or remotely via RIMs remote management. The AI application stack allows for advanced modelling to be performed based on targeted production outputs and constant refining and optimization of the performance of the process according to the invention.

Feedstock Processing

Solid/Solid Separation

The method and system of the present invention can be applied to any food processing steps, such as cooking, dehydrating, cutting into target pieces, or separation into components.

Figure 7:
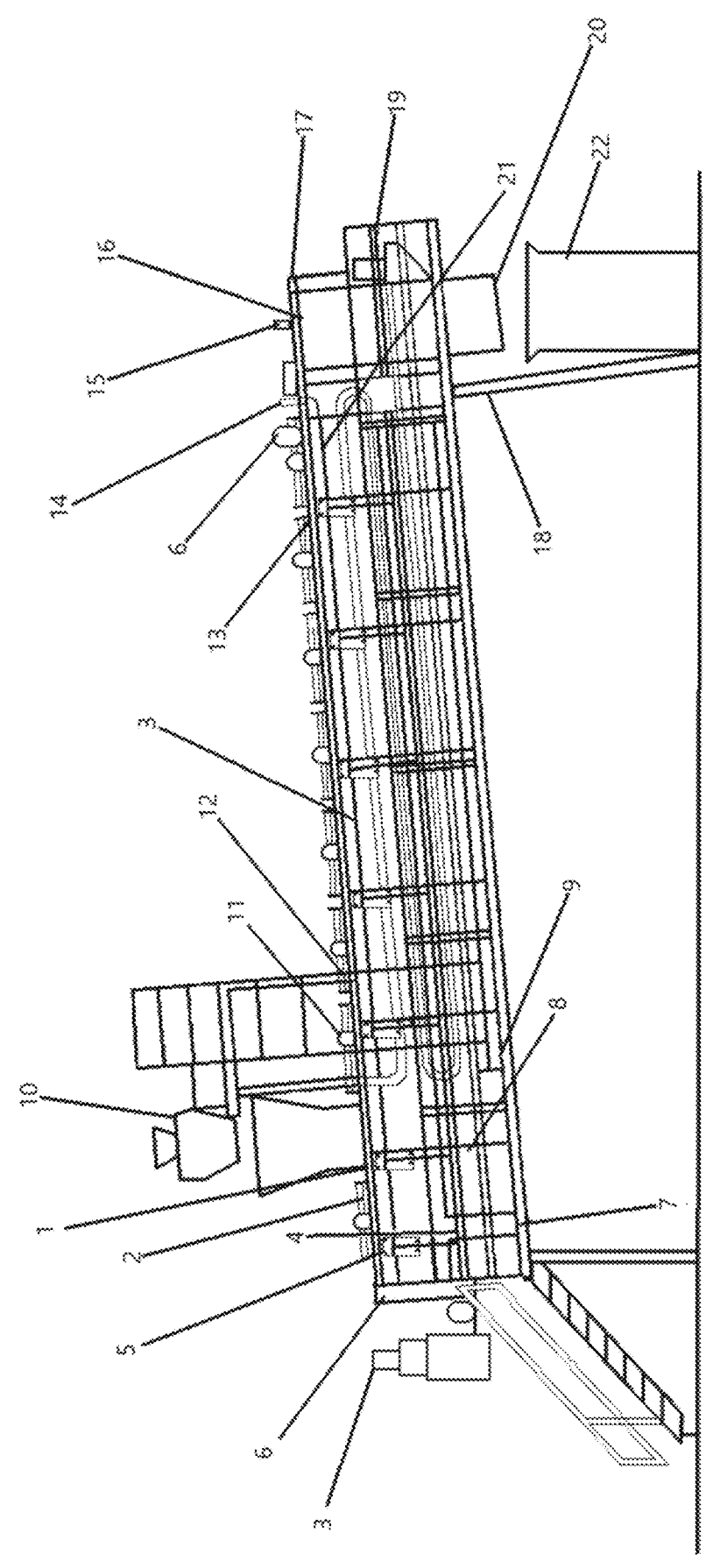
FIG. 7 illustrates a device according to the present invention comprising a single screw, digital CCE (dCCE) equipped with an airlock chamber.

In a preferred embodiment following inspection and washing the feedstock is transported, typically by conveyor, to be systematically cut into pieces of desired dimensions prior to further processing. Sensors detect the size/dimensions of the feedstock pieces as part of the information for real-time optimisation of the feedstock processing. Optimisation of the process may require adjustment of the blades or blade width. This is important, for example, when the pieces are proceeding to CCE because adjusting to blade to optimise "diffusion cuts" concomitantly optimises the solids extraction efficiency of CCE. A preferred embodiment of the CCE is depicted in FIG. 7.

In another embodiment the feedstock is subjected to decortication, that is, the feedstock is cut into pieces of desired dimensions and fed through a machine for stripping the skin, bark or rind. Decortication is particularly effective for plants comprising fibre, such as nuts, wood, plant stalks and grains. Typical products of decortication include the tough woody exterior (bark), a tough woody interior (hurd) and cellulosic fibres from the phloem of the stalk (bast).

A typical decorticator and decorticating process is disclosed and described in Australian Provisional Patent Application Number 2020904477 to Defugo Group Australia Pty Ltd which is incorporated herein by reference. The decorticator device for deriving useful products from long stalk biomass comprising hurd, bark and bast, includes;

a pair of rotating sizing members adapted to size the stalks when passed therebetween, a cutting head for cutting the stalks of the biomass longitudinally, a first rotating cutting member for removing a first product comprising hurd from the biomass using a rotating cutting member, a second rotating cutting member for removing a second product comprising bark from the biomass, the remaining bast comprising a third product, and separate outlets for each of the first product, the second
product and the third product.

The decortication process for deriving useful products
from biomass comprising hurd, bark and bast, includes the
steps of;
    sizing long stalks of the biomass,
    cutting the stalks of biomass longitudinally,
    generating a first product comprising hurd from the bio-
        mass using a rotating cutting member,
    generating a second product comprising bark from the
        biomass using a rotating cutting member,
    generating a third product comprising bast.
Liquid/Solid Separation In a fourth aspect of the present invention, there is
provided an improved method for the effective separation of
the feedstock components into liquid and solid components.

Counter Current Diffusion Extractors (CCE) are known in
the food processing industry as continuous and stepless
contacting devices in which the solid and liquid phases run
counter current and are thus separated. As previously men-
tioned, the feedstock is typically cut or chopped into pieces
of desired size prior to being introduced to the CCE device.
Alternatively, or in addition, the feedstock is subjected to
decortication and one or more of the resultant bark, hurd and
bast is introduced to the CCE device.

Liquid extracted from the feedstock is reintroduced to the
CCE device to provide the liquid counter current.

The CCE device is not only useful for the extraction of
soluble components from organic and inorganic solids, but
also as part of processes for infusion, heating of solids,
cooling of solids, chromatographic separation, continuous
bio-reaction, the inhibition of bio-reaction, wetting of solids,
dewatering of solids, mixing of solids, continuous chemical
reactions and removal of pollutants and other putrescible
products.

The CCE as depicted in FIG. 7 typically includes the
following characteristics; "can perform co-current flow in
addition to counter current flow of solid and liquid phases,
    the solid phase to be stationary whilst the liquid phase
        moves,
    a concentration gradient can be established between the
        solid and liquid phases and the gradient maintained,
    a temperature gradient can be established between eh
        solid and liquid phases and the gradient maintained,
    either a true plug-flow can be established for both the
        solid and liquid streams, or a flow in which there is
        significant back mixing of either the solid or liquid
        phases,
    the morphology of the particles in the solid phase can be
        controlled, including, for example, the surface area, and
    the contact time between the solid and liquid phase can be
        controlled.

There are eight key operating variables which determine
the efficiency of diffusion, infusion or heat transfer in the
CCE device, these are;
    the feed rate of the solid phase,
    the relative proportions of the liquid and solid phases,
    the temperature (which will vary depending on the solid
        and liquid),
    the preparation of the feedstock solid (e.g., slice thick-
        ness, size, etc),
    the angle or operation,
    the residence time,
    the number of cycles per residence time, and
    the operating level of the liquid phase.

Each of the above listed variables is stepless and can be
varied of a very wide range of values. Therefore, although
the CCE is mechanically simple, its operation is mathemati-
cally complex.

In the following description of use of the CCE device
reference is made to use of an airlock chamber for intro-
ducing feedstock into the CCE device and pressure control
in the airlock chamber or other parts of the CCE device
using a pump or equivalent device. However, it will be
appreciated that some applications of the CCE device can
operate at ambient pressure. Similarly, while some applica-
tions require temperature control in some or all parts of the
CCE device, other applications can be carried out at ambient
temperature.

An embodiment of the CCE device of the present inven-
tion is depicted in FIG. 7. Preferably, the device of the
present invention comprises a single screw, digital CCE
(dCCE) having a housing equipped with an airlock chamber
(1) such as a CCentry airlock chamber. Preferably, the
airlock chamber (1) comprises an airtight vessel having an
openable top and an openable floor.

In some embodiments, the feedstock may be dropped
directly from the conveyor belt through the openable top,
into the chamber while in other embodiments the feedstock
may be dropped from a cutting device, such as an adjustable
cutting head (10) into the chamber. Preferably, the cutting
device is specific to the type of feedstock being processed at
that time.

Alternatively, or in addition, feedstock comprising one or
more of bark, bast and hurd generated from decortication
may be introduced into the chamber.

Once the feedstock is dropped into the airlock chamber
(1) the top is closed and then the floor of the chamber opens,
and the produce drops into a dCCE entry area with airtight
shutter doors on either side. The feedstock continuously
drops onto the top and is contained within a hopper. The
feedstock then drops into the chamber when the top reopens,
after the floor placer-closes. This process happens very
quickly and preferably avoids build-up of bulk feedstock.

Preferably, sensors in the process of the present invention
capture information relating to any one or more of degrees
brix (° Bx), water level, fibre level, and weight. This
information is processed by the RIMS as a sub-routine. The
information is used as input to an algorithm for controlling
and adjusting flow rate of the feedstock and flow rate of the
extraction liquid. The velocity and rate of movement of
feedstock into the airlock chamber and the rate of feedstock
flow into the dCCE is thus automatically controlled in
real-time.

Preferably, the dCCE includes a CCvacuum enablement
(15). This can be achieved by sealing the dCCE and reducing
the pressure therein by up to approximately 1 bar (100 kPa).
Accordingly, the ability of the airlock chamber to be airtight
and able to withstand reduced internal pressure is important
to this embodiment of the present invention.

Preferably, the separation of feedstock according to the
method of the present invention enables unique product
outcomes by real-time recipe optimization in combination
with the dCCE device of the present invention.

Preferably, the dCCE is equipped with one or more
measurement devices such as sensors that capture a set of
operating data while the feedstock is being separated in the
dCCE. The one or more sensors relay that data to the RIMS
where it is processed as a sub-routine and an algorithm is
generated to continuously optimize the efficiency of the
dCCE. Based on the captured data, the RIMS assesses the
real-time state of the separation process and operating conditions against the desired end-product(s) defined in the pre-loaded recipe program. If necessary, the RIMS is then able to transmit instructions to the dCCE to alter the operating conditions of the dCCE whereby the dCCE is able to operate more efficiently to produce the desired product.

It will be apparent to the skilled addressee that the use of the digitization of the CCE requires one or more measurement devices such as sensors to capture data relating to the operation of the CCE. Preferably, the data captured relates to any one or more of the following parameters:

Pressure—the ability to monitor and adjust the processing pressure concomitantly allows the RIMS to control the temperature. Pressure control is also key to recovery of feedstock components such as terpenes using the process and method of the present invention—as described below. Tight regulation of pressure also allows control over contamination of products associated with any unwanted by-products. However, as noted above, some processes can be carried out at ambient pressure.

Temperature—the ability to monitor and adjust temperature in real-time may be used to identify and extract one target component, such as terpenes, in preference to another. This real-time optimization of temperature also allows process control over the conversion or non-conversion of acids or lipids and thus prevent the production of undesired compounds within the target component. However as noted above, some processes, such as those that are not directed to recovery of terpenes, can be carried out at ambient temperature.

Size—The size of feedstock moieties, such as chopped pieces of feedstock is directly related to the overall extraction efficiency and yield of components. Size data may be transmitted to RIMS for real-time optimization of the recipe. In some situations, there will be a need to adjust the solids extraction efficiency by adjusting the "diffusion cuts" by the continuous adjusting of the blade width on the removable cutting heads of the dCCE. Optimizing the diffusion cut extraction may be achieved by using different types of blades and cuts and by controlling the thickness of cut used for the solid extraction, in combination with adjusting the temperature and time processed in the dCCE. Preferably, the dCCE comprises removeable and adjustable cutting heads and a single screw blade (see TBD diagram), which allows for the control of size, cuts and surface area and thereby allows regulation and optimization of extraction and yield.

Brix (Liquid & Liquid solids: fibre)—the ability to monitor brix yield of liquids and liquid solids allows the RIMS to adjust the flow rates of the feedstock as well as diffusion volumes and time.

Weight—the ability to monitor the weight of the feedstock allows the RIMS to control and optimize the diffusion liquid levels. If there is too little feedstock, it will float to the back of the dCCE. If there is too much feedstock, then extraction cannot occur efficiently as it will move over the top of the screw. The weight of the feedstock aids in the sheer extraction by pressing and holding it against the screw of the dCCE.

Liquid level—the ability to monitor and control the liquid level in the dCCE allows the optimization of the dCCE performance and delivering recipes on target. The proper balance of liquid and feedstock provides the correct weight to hold produce against the rotatable screw conveyor without floating and moving just enough to move with the agitation and thereby separate. If there is too much liquid, then it washes feedstock to the back of the dCCE. If there is too little liquid, then the desired product will not extract, and it will move up the dCCE without full extraction.

Liquid solids—the ability to monitor liquid solids (fibre) allows the RIMS to adjust the agitation of the feedstock to thereby manage the density of the liquid solids and achieve targeted production yields of fibre in line with the recipe.

Agitation—monitoring and adjusting agitation of the feedstock in the dCCE allows the RIMS to control extraction of the feedstock. For example, agitation may be slowed down if the brix extraction is not as effective as required or sped up when the required extraction rate is achieved or exceeded. In some embodiments, the dCCE comprises a hydraulic tilt agitation control unit which provides means for the tilt adjustment of the entire trough of the unit and is controlled via the RIMS and the onboard CPU of the dCCE. The sensors transmit data on agitation to the RIMS where it is processed as a sub-routine and an algorithm is generated to adjust the tilt of the trough to achieve the desired effect of slowing down or speeding up.

Liquid diffusion points of entry—the ability to monitor and control multiple entry points for liquid diffusion further allow the management of extraction in real time in certain embodiments of the dCCE. The RIMS communicates the instructions to the onboard CPU of the dCCE to select an appropriate combination of adjustable diffusion spaced entry points to achieve optimized extraction in real time. With reference to FIG. 7, adjustable diffusion spaced entry points 11 and 13 allow the CCE to select the appropriate combination of spaced entry to optimize extraction.

By adjusting the location of the entry point of each liquid stream, the flow distance for each liquid stream can be controlled, and by adjusting the angle of the screw it is possible to adjust the pressure head driving the stream. These two operating factors must be optimised in real time to obtain maximum efficiency. Adjustments are subject to practical limits, and for example, if the angle of the screw is too steep, the solid stream will simply slip back down through the screw.

These two factors can be changed in response to changes in the porosity of the solid phase. The porosity of the solid phase may diminish as it progresses up the screw and the viscosity and brix of the incoming liquid may also diminish. The porosity of the solid phase is a function of the degree to which the solid collapses as diffusion takes place and the viscosity of the liquid phase typically increases as extraction from the solid increases.

The configuration of the housing around the screw comprises a trough portion located under the screw, and a lid portion located on top. If the lid is convex, any condensate tends to run along the sides of the housing to the point of liquid discharge, causing unwanted dilution. This can be avoided by having a concave lid portion.

Screw lifters—As mentioned above the dCCE includes a single screw for bringing the solid and liquid phases into contact, the efficiency of the extraction relying in part on optimisation of the contact between the solid and liquid. The effect of drag force between the solids and the loading force of the screw tends to raise the solids out of, and above the liquid during the forward motion of the screw. The exposed solids then tend to slump back into the liquid phase during the reverse motion of the screw. The amount or exposure and slumping of the solids tends to vary from feedstock to feedstock but the greater the exposure and slumping, the lesser the contact between solid and liquid.

In order to address obtain better contact between solid and liquid, lifter bars can be introduced into the housing around the screw to ensure that the exposed solid is transferred periodically across the screw and back into the liquid. This can result in significant gains in yield and can enable the CCE to improve extraction from materials with high drag factors and low slump factors.

In particular, the number and position of the lifter bars may be optimised to avoid the solid packing tightly between the lifter bars. Solid packed between the lifter bars can retard or jam the operation of the screw, increasing torque to a point of causing catastrophic structural fail of the screw. This can be a problem with products such as coffee beans, and high density materials such as sugarcane.

In an alternative embodiment, the screw lifter bars are replaced by screw lifter plates attached to the screw. Preferably the screw lifter plates are removably located at various points along the screw. Plates of different configuration and different size can be tailored and matched to the solid being processed. The concept of removable plates is particularly useful if the CCE device is to be used for processing a very wide selection of feedstock as the size of the screw lifter plate has a significant impact on the overall extraction and yield.

Terpene Separation

Advantageously, the dCCE device and process of the present invention facilitates the separation of terpenes which are typically associated with distinctive aromas and flavours. Chemically, terpenes are hydrocarbon structures built up from isoprene ($C_5H_8$) units. Terpenes are not typically able to be isolated by conventional CCE. It is the ability to provide a reduced pressure environment that makes possible the isolation of terpenes.

As noted previously, pressure is typically reduced by about 1 bar in the dCCE device of the present invention in order to affect the isolation of terpenes. Specifically, the terpenes are recovered from the dCCE in the form of a vapour and then liquified by cooling to a suitable temperature. The liquid is then subjected to distillation and/or fractionation to remove unwanted flavours or target specific flavours. The final product may be liquified and packaged. Due to their aromas and flavours, terpenes are widely used in the food, cosmetics, pharmaceutical and biotechnology industries.

Separating Solids or Fibre

Figure 9:
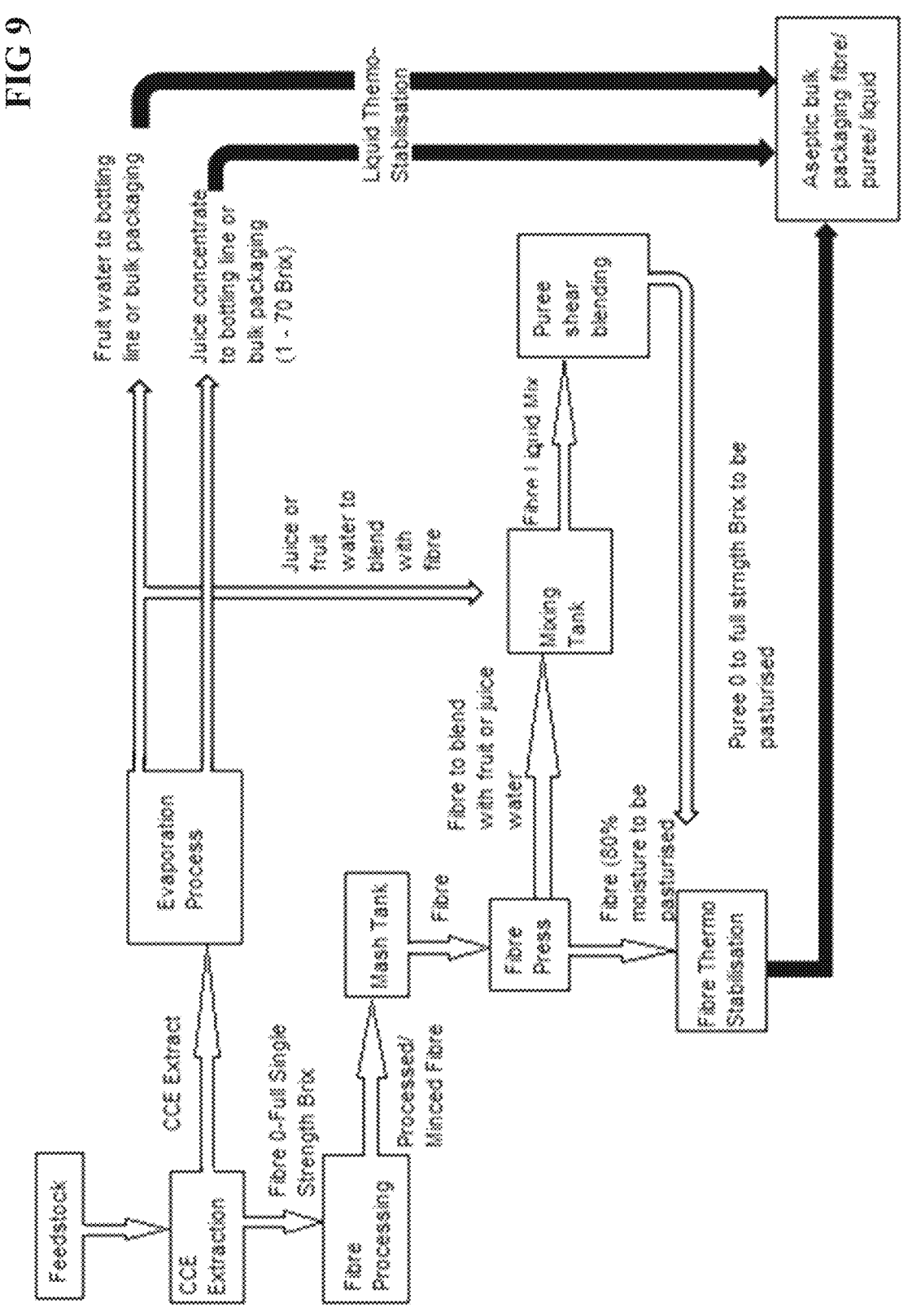
FIG. 9 is a flow chart illustrating the use of the dCCE in the process for separation of liquid from fibre followed by recombination to produce targeted products.

The dCCE and process of the present invention are also advantageous for the separation of solids or fibre. FIG. 9 is a flow chart illustrating the use of the dCCE in the process for separation of liquid from fibre followed by recombination to produce targeted products.

The incorporation of a changeable cutting head (10) in the dCCE is particularly useful for the separation of solids or fibre. If the end use of the fibre is known, then the feedstock may be cut to desired specific size using a chosen cutting head. If the end use is not known, then the fibre may be cut to a larger size for further processing at a later time.

In another embodiment the feedstock is subjected to decortication, that is, the feedstock is cut into pieces of desired dimensions and fed through a machine for stripping the skin, bark or rind. One or more products of decortication (bark, hurd or bast) may be fed into the dCCE.

The next step is dewatering using a belt press (also known as a belt press filter). In a preferred embodiment, feedstock pieces comprising the fibre is transferred from the dCCE to a holding tank. The feedstock pieces are fed in a controlled manner from the holding tank in between two moving belts of filter cloths. Liquid is extracted initially by gravity, then by squeezing as the filter cloths pass around rollers. The liquid exits through a port and is returned to the dCCE. The fibre is scraped off the filter cloths and then transferred to a mix tank where it is either mixed with a desired volume of liquid for brix manipulation or it is left as zero sugar (brix).

The ability to manipulate component sugar content to a desired target outcome is a key differentiator for the present inventive process since methods of the prior art typically produce fibre with approximately 5° brix. Wet fibre may then be pasteurized before bulk aseptic packaging. Alternatively, fibre may be moved to a drier, and the dry fibre either bulk packaged or milled. Dry fibre is a valuable product used as a dietary supplement or nutritional supplements, particularly to fortify food products.

Separation of Liquids

Figure 2:
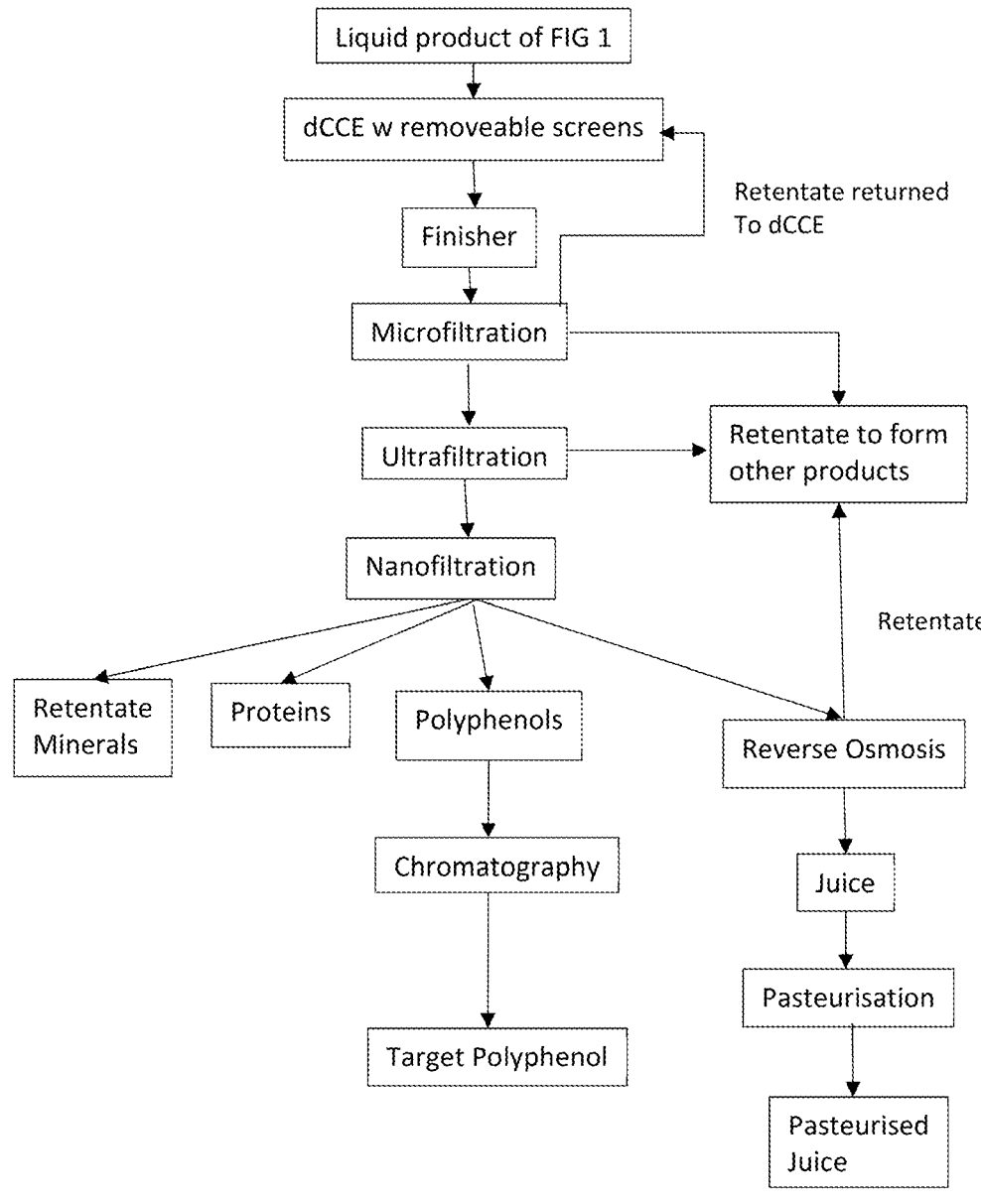
FIG. 2 illustrates steps associated with the further processing of the liquid separated in FIG. 1.

In a further aspect of the present invention, the process may comprise the production of liquid components using the dCCE. FIG. 2 is a flow chart illustrating the steps of one embodiment for processing of the liquid.

The production of liquids may be enhanced by the addition of removeable screens at the rear of the dCCE. The screens assist separation of a desired target volume and help to maintain the desired amount of solid in the liquid. The screens prevent bulk movement of fibre beyond the back of the rotatable screw conveyor. These screens are configured for separation of different target volumes and may be readily removed and replaced according to the desired volume and desired proportion of solids in the liquid.

Liquid thus recovered from the dCCE may be subjected to further processing such as finishing and/or filtration. In one embodiment, liquid is transferred from the CCE through a finisher. Finishing is the process of clarifying a liquid by passing it through a sieve to remove solids, such a pulp. Finishing also removes solids and other matter that may otherwise puncture filtration membranes in a later filtration step. Finishers are typically cylindrical sieves in a screw of paddle conformation.

Filtration will be well known to the person skilled in the art. Filters are classed according to pore size: microfilter (0.01 to 1.0 micron), ultrafilter (0.001 to 0.01 micron), nanofilter (0.0001 to 0.001 micron) and reverse osmosis (<0.001 micron). The different pore sizes can be used to retain molecules of different molecular weights ranging from >100,000 (microfiltration), 1,000 to 300,000 (ultrafiltration), 300 to 1,000 (nanofiltration) and 100 to 300 (reverse osmosis). Typically, the process of the present invention would include microfiltration or ultrafiltration.

For example, if the liquid is a cloudy juice, water can be removed from this product using an evaporator to achieve the desired ° brix. In the case of a fruit juice, the extracted liquid may still contain soluble and non-soluble dietary fibre, minerals, polyphenols and proteins. Further, this is the point where terpenes may also be captured. The boiling points of desired terpenes may not have been reached in the dCCE. The evaporator in this instance is used without filtration or reverse osmosis.

When a clear juice or concentrate is the desired component, the process of the present invention may be used to extract polyphenols, minerals and proteins. For example, the juice may be transferred from the dCCE to a finisher. The juice then undergoes microfiltration, where retentate is returned to the dCCE or used to make cloudy juice. The juice then undergoes ultrafiltration where more retentate is returned to the dCCE or cloudy juice. The juice then undergoes nanofiltration and three streams are extracted: 1) retentate minerals, 2) proteins, and 3) polyphenols. The polyphenols are sent through an algae centric extraction process or chromatography system depending on target polyphenol. The juice continues on through reverse osmosis for the removal of fruit water which is another product.

The final clear juice is then moved to an evaporator and pasteuriser for the final preparation of clear juice or concentrate.

Fusion

Figure 3:
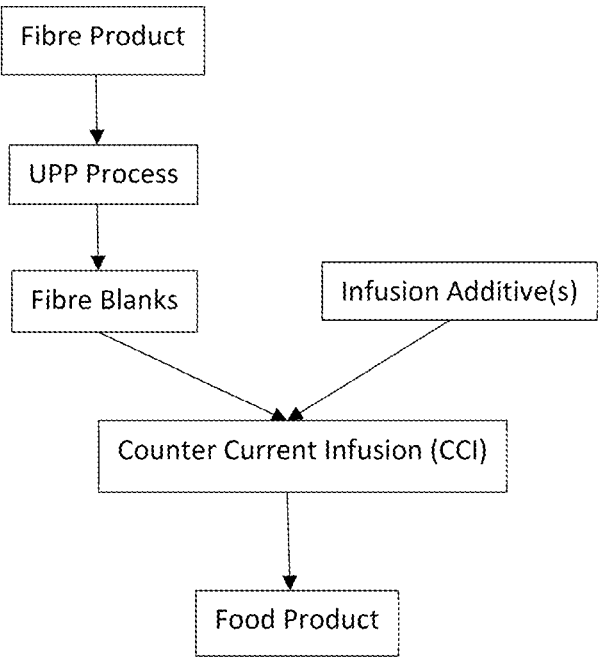
FIG. 3 illustrates steps associated with the fusion process of the present invention whereby the fibre product of FIG. 1 is further processed.

In another aspect the present invention may include a "fusion" process, or the bringing together of two or more products. FIG. 3 is a flow chart illustrating one embodiment of the fusion process of the present invention. Preferably, at least one of the two or more products brought together result from the process of the present invention. It is particularly preferred that the fusion process comprises the infusion of fibre with other components, preferably soluble components. The soluble component may include, for example, sugars, oils, minerals, polyphenols and probiotics that enhance both health and flavour.

Preferably, counter current infusion may be used for infusing a fibre blank with soluble components. The fibre blank is simply fibre from a piece of feedstock for example an apple or pear, or any fibre from fruit, vegetables or plants that has some or all sugars, oils and other soluble material removed in the dCCE process as described above. The fibre blank is then passed through the Counter Current Infuser (CCI) such that it is infused with an infusion liquor. Typically, the infusion liquor comprises soluble species that have been removed by the process of the present invention, such as sugars, oils, proteins, vitamins, minerals, polyphenols and probiotics.

By controlling the infusion liquor the CCI is able to ensure a controlled amount of the infusion liquor is infused into the blank. Accurate measurement of the amount of liquid infused into a known amount of fibre is particularly important if the product is to be sold in packaging that is associated with claims relating to nutritional effects, dosage or daily consumption amounts. This aspect of the process of the invention permits the user to design infused food products that comprise specific ingredient profiles. The fusion process according to the present invention may be suitable for products including edibles such as snacks, smokables, over the counter pharmaceuticals and nutraceuticals.

Figure 8:
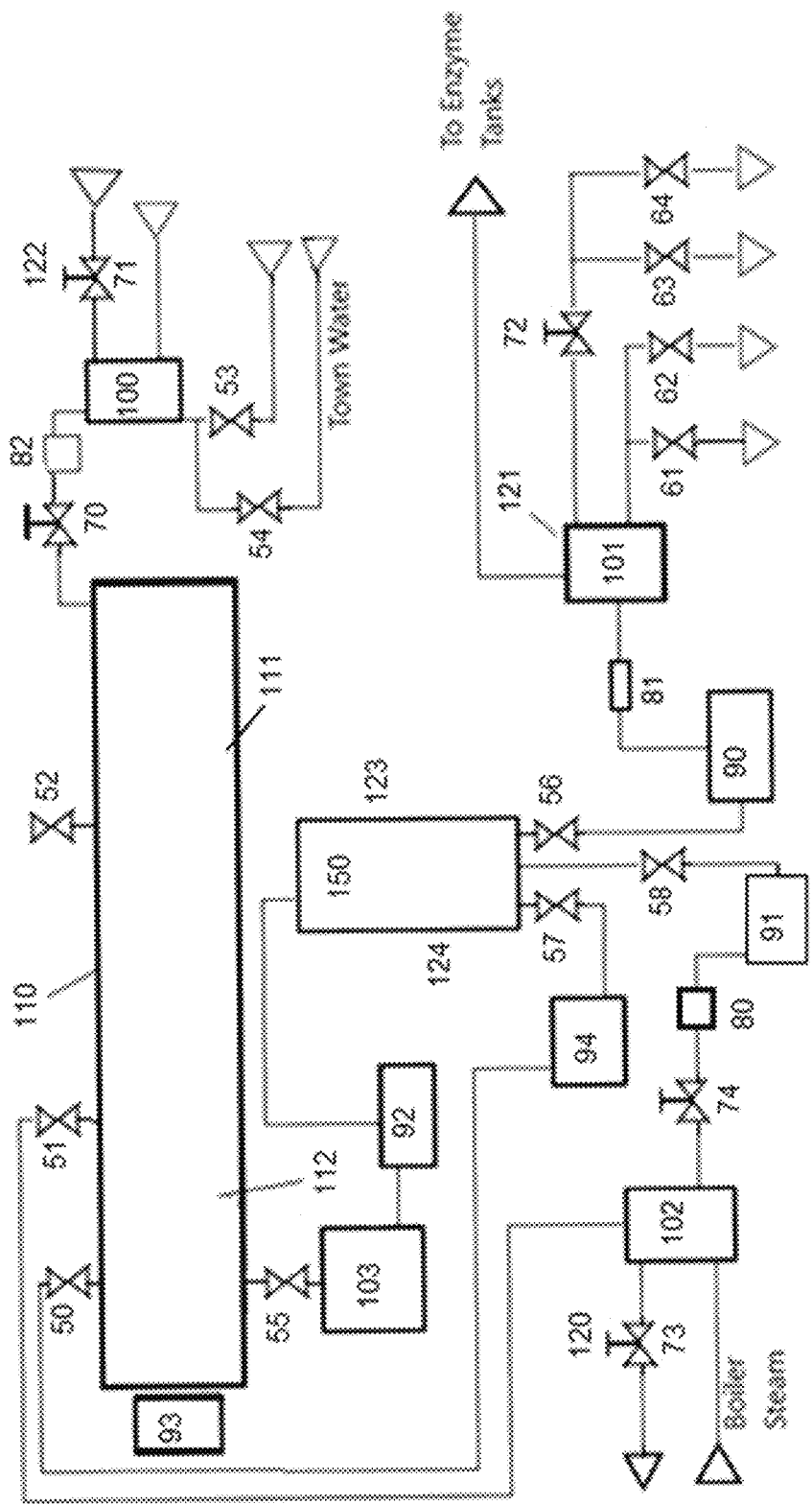
FIG. 8 illustrates part of a processing system according to the present invention comprising the dCCE device of FIG. 7.

FIG. 8 illustrates a system comprising the dCCE device of FIG. 7. The CCE screw auger (153) in the trough housing (152) is the central unit in the system fed by a system of pipes conducting fluid. In the illustration the arrowheads (► or ◄) indicate direction of fluid flow. FIG. 10 illustrates a control sheet showing operational control parameters for the processing system illustrated in FIG. 8.

In this illustration the feedstock processing may comprise a series of steps that are controlled by the method of real-time optimisation of feedstock processing according to the present invention. For example, according to a preloaded a recipe program, the instructions to the dCCE may be as follows:

TABLE 1

| Order of performance | Part (as per List of Parts) | Operation | Command |
|---|---|---|---|
| 1 | 71 | Set | 80° C. |
| 2 | 54 | On/Off | On |
| 3 | 70 | Set | 3 Mt/hr |
| 4 | 55 | On/Off | On |
| 5 | 92 | On/Off | On |
| 6 | 58 | On/Off | On |
| 7 | 101 | On/Off | On |
| 8 | 74 | Set | 20 Mt/hr |
| 9 | 73 | Set | 90° C. |
| 10 | 51 | On/Off | On |

22

Optimal extraction times for the CCE are typically between 40 and 60 minutes. The CCE screw timing is set to achieve a residence timing, based on a table such as the following that lists Forward and Reverse screw timing (in turns per minute). In Table 2, the optimal extraction times include the boxes containing underlined numbers, and the other boxes indicated times that are out of range:

TABLE 2

RESIDENCE TIME SETTINGS TABLE

| Reverse | Forward | | | | | | | | | | |
|---|---|---|---|---|---|---|---|---|---|---|---|
| | 25 | 26 | 27 | 28 | 29 | 30 | 31 | 32 | 33 | 34 | 35 |
| 15 | 35 | 32 | 30 | 29 | 27 | 26 | 25 | 24 | 23 | 22 | 22 |
| 16 | 39 | 36 | 34 | 32 | 30 | 28 | 27 | 26 | 25 | 24 | 23 |
| 17 | 46 | 41 | 38 | 35 | 33 | 31 | 30 | 28 | 27 | 26 | 25 |
| 18 | 53 | 48 | 43 | 40 | 37 | 35 | 33 | 31 | 29 | 28 | 27 |
| 19 | 64 | 56 | 50 | 45 | 42 | 39 | 36 | 34 | 32 | 31 | 29 |
| 20 | 78 | 66 | 58 | 52 | 47 | 43 | 40 | 38 | 35 | 33 | 32 |
| 21 | 100 | 81 | 69 | 61 | 54 | 49 | 45 | 42 | 39 | 37 | 35 |
| 22 | 136 | 104 | 85 | 72 | 63 | 56 | 51 | 47 | 43 | 40 | 38 |
| 23 | 208 | 142 | 108 | 88 | 75 | 66 | 59 | 53 | 49 | 45 | 42 |
| 24 | 425 | 217 | 147 | 113 | 92 | 78 | 68 | 61 | 55 | 50 | 46 |
| 25 | HOLD | 442 | 225 | 153 | 117 | 95 | 81 | 71 | 63 | 57 | 52 |

EXAMPLES

The present invention will now be described with reference to the following non-limiting Examples.

Example 1—Apple Feedstock Processing

In the present example the feedstock comprises apples. This illustrates how the present invention can be used to separate an apple feedstock into numerous useful components such as liquids, solids, fibre, terpenes, polyphenols, minerals, proteins or combinations thereof. In the past, apple feedstock has typically been processed by the food industry to provide a single product.

Preferably, the food processing arrangement is configured for data transfer from produce delivery trucks. Transport containers typically include barcodes that can be scanned by the recipient to track the history of the feedstock including the origin. The information scanned may also include other relevant data including lists of certificates, sprays, spray charts, fertilizers and pesticides used in production of the feedstock.

The feedstock is scanned or subjected to other sensors on arrival at the processing plant to capture information such as brix, water levels, fibre levels, size and weight. This initial data is uploaded to a server and recorded as a digitised profile of the feedstock in a database.

The shipment of feedstock is then allocated to holding bins.

In general, feedstock is called forward by plant operators as needed for a production run. Each production run is carried out to a recipe based process. In the present example, a call is made for organic Granny Smith apples to come forward and be produced with Recipe DB-Apple EAdam to provide 6 brix cloudy juice and light soluble fibre solid bar.

The produce moves through an inspection table for removal of any defective apples or detritus. The apples are then taken through a HOCl or Tygrus pH adjusted wash bay.

Following the wash down step the apples are moved along a conveyor belt that carries them to the separator. The Recipe DB-Apple EAdam has defined settings for:

a. Temperature;
   i. Extraction,
   ii. Terpene release,
b. Time;
c. Agitation speed;
d. Tilt degree;
e. Diffusion Agent;
f. Volume of Produce;
g. Volume of Diffusion Agent;
h. Solids extraction efficiency;
i. Cut size of long and short sides of produce.

The conveyor belt moving the apples is embedded with IoT sensors. The apples are scanned again for brix, water level, fibre level, and weight. The IoT sensors communicate this data to the computer server for real-time optimization of the preloaded recipe for this batch of apples. The data is transferred by a network to a Real-Time Information System (RIMS).

The RIMS is comprised of a server, database and a user interface where the captured data is processed in an Efficiency Digital Algorithm. The algorithm calculates optimal instructions and adjustments of any of the pre-defined settings (a-g above) of the recipe that has been pushed to the Counter Current Extractor (CCE) computer process unit (CPU).

For example, a RIMS process optimization of a recipe could result in the application of the following temperature controlling using the EDA. In this example, a sensed temperature (S) is compared to a recipe temperature (N) and if S is greater than N then instructions are sent to the CPU to "reduce temperature by X" based on "formula Z". The instruction could then be passed to the CPU instruction relay wherein the sensed temperature resets instructions and compares feedstock flow speed to database "DB-spd". This could be followed by sending to the CPU an instruction to "reset temp then increase flow speed" if an increase is required or, send an instruction to "decrease flow speed then reset temp" to CPU if a decrease is required.

The apples move to the separator and a slicer cuts them into pieces. The size of these pieces is directly related to the overall extraction and yield. Size data is transmitted to the RIMS for real-time optimization of the DB-Apple EAdam Recipe, in this case, to adjust the solids extraction efficiency (h-i) by adjusting the "diffusion cuts". The diffusion cuts are controlled by the continuous adjusting of the blade width on removable cutting heads. Optimizing the diffusion cut extraction is achieved by varying the types of blade and cut used on the surface area and by controlling the thickness of cut used for the solid extraction. Control of the processing temperature and time CCE are also important.

The cutting heads are enhanced by the addition of removeable and adjustable cutting heads (10) to the CCE single screw blade. This allows quick and easy removal and refitting of the appropriate cutting head for the produce size to be processed. These features allow control of size, cuts and surface area and differentiate the present invention from the prior art with respect to extraction and yield. This includes the quick and easy removal and refitting of the appropriate cutting head for the produce size be processed.

The apple slices drop directly from the cutting head into an airlock entry chamber (1) added to the single screw CCE. Once the apples drop into the chamber the top slides closed and then the floor of the chamber slides open, and the produce drops into the CCE entry area. The entry area has airtight shutter doors on either side. The apples continuously drop onto the top slide within the hopper and then into the chamber when the slide reopens, after the floor slides back into place. This process happens very quickly, and bulk produce is never allowed to build up on the top slide.

The IoT data capture of brix, water content, weight and fibre yield are processed by the RIMS as a sub-routine of the algorithm to control and adjust flow rate of the apples and flow rate of the diffusion agent, hence affecting the speed movement of the airlock entry chamber and the inflow of produce into the CCE.

This entry point is necessary to allow pressure to be reduced within the CCE using vacuum enablement (15). Terpene production using the CCE is made possible by sealing the CCE unit and reducing the pressure by 1 bar, hence the need for the airlock entry chamber.

Deposit of the apples in the CCE, is the start of the extraction stage of the process of the present invention. The IoT sensors that communicated the data following the wash down and separation/slicing to the RIMS triggered an initial optimization of the preloaded recipe for this batch of apples and communicated instructions to the CPU of the CCE. The next adjustment of the process parameters is facilitated by the set IoT sensors that exist within the CCE. These sensors capture data while the apples are being processed and relay that data to the RIMS to enable the continuous optimization of the efficiency of the CCE. The RIMS and algorithm assess the state of the real time production and operating conditions against the targeted product(s) of the loaded recipe in the system. IoT sensors in the CCE measure the following parameters:

Pressure/Vacuum—the ability to monitor and adjust the pressure/vacuum allows control of extreme high and low temperature. It also allows recovery of terpenes. This also avoids contamination of products with optimization of the pressure/vacuum.

Temperature—the ability to monitor and adjust temperature is used to identify and extract one target over another and fine tune the boiling points of certain terpenes. This real-time optimization also allows for the conversion or non-conversion of acids within the target extract.

Brix (Liquid & Liquid solids: fibre)—the ability to monitor brix yield of liquids and liquid solids allows adjustment of the flow rates of the produce as well as diffusion volumes and time.

Weight—the ability to monitor the weight of the produce allows control and optimize of the diffusion liquid levels. If there is too little produce the apples will float to the back of the CCE. If there is too much produce, then extraction cannot happen as the apples move over the top of the screw. The weight of the produce aids in the sheer extraction by pressing and holding it against the screw.

Liquid level—the ability to monitor and control the liquid level in the CCE is critical to the optimization of the CCE performance and delivering recipes on target. The proper balance of liquid and produce provides the right weight to hold produce against the screw without floating and moving just enough to move with the agitation and separate. If there is too much liquid, then it washes produce to the back of the CCE. If there is too little liquid, then the targeted produce will not extract, and it will move up the CCE without full extraction.

Liquid solids—the ability to monitor liquid solids (fibre) is a critical aspect to adjusting the agitation that is sited below. Management of the density of the liquid solids allows for targeted production yields of fibre in line with the recipe.

Agitation—all of the above parameters have an effect on the agitation and movement forward of the apples. As the agitation is monitored, it is slowed down when the brix extraction is not happening at the desired level and is sped up once the desired extraction is being achieved. One of the innovative enhancements to the CCE is the hydraulic tilt adjustment of the entire trough of the unit that is controlled via the CPU in the CCE. FIG. 7 shows the location of a hydraulic lift agitation control unit (18) for this purpose. The IoT sensors transmitting data on agitation to the RIMS in turn allows for instructions to be sent to the CPU to adjust the tilt of the trough to achieve the desired effect of slowing down or speeding up.

Liquid diffusion points of entry—the ability to monitor and control multiple entry points for the liquid diffusion are instrumental in the managing extraction in real time. The RIMS communicate the instructions to the CPU of the CCE to select the appropriate combination of spaced entry points to achieve optimized extraction in real time.

The current version of the CCE allows the apple feedstock to be split into three target produce groups: terpenes, liquids and solids.

Terpene recovery using the CCE is made possible by sealing the unit and reducing the internal pressure by about 1 bar. By applying a slight vacuum within the CCE terpenes are sucked out of the CCE as vapor and liquified. The liquid is then split using distillation/fractionation to remove unwanted flavours or target specific flavours. The final product is liquified and packaged.

Solids or fibre production by the CCE has been enhanced with the addition of a changeable cutting head to the end of the CCE. If the end use of the fibre is known, then the apples are cut to specific size using the cutter. If the end use is not known, then the apples are cut to a larger size for processing at a later time. Fibre moves from the CCE to a holding tank to give volume control to the belt press. The belt press removes excess water which is returned to the CCE.

The apple fibre moves to mix tank where it is either mixed with apple juice for brix manipulation or the apple juice is left as zero sugar (brix). This target product outcome is a key differentiator for the process of the present invention. Prior art methods typically produce fibre with approximately 5% brix. Wet fibre moves to pasteurization and bulk aseptic packaging and dry fibre moves to the drier, and then either bulk packaging or milling to a final specification in accordance with customer needs.

Apple juice production by the CCE has been enhanced with addition of screens at the back of the CCE to stop bulk movement of fibre beyond the back of the screw. These screens are removable and help maintain the targeted volume of solids in the liquid. Apple juice then moves from the CCE through a finisher to remove solids.

When a cloudy apple juice having a range of 5 to 6 brix is desired, water is removed to return the apple juice to single strength via evaporator. Cloudy apple juice will include dietary fibre-soluble and non-soluble, minerals, polyphenols and proteins. This is the point where terpenes may also be captured. The evaporator in this example is used without filtration or reverse osmosis.

When a clear apple juice or concentrate is the target product, the polyphenols, minerals and proteins are also extracted. The apple juice moves from the CCE to a finisher to remove solids and anything that may puncture filtration membranes used in further processing. The apple juice proceeds to a microfiltration step, where retentate is added back to the CCE device or used to make cloudy juice.

The next step is ultrafiltration of the apple juice where more retentate is added back to CCE or cloudy juice. The apple juice then moves through nanofiltration, and three streams are extracted: 1) retentate minerals, 2) proteins, or 3) polyphenols. The polyphenols are sent through an algae centric extraction process or chromatography system depending on target polyphenol. The juice continues on through reverse osmosis for the removal of fruit water which is another product. The final clear juice then moves to an evaporator and pasteuriser.

Counter Current Infusion (CCI)

Counter current infusion is used for infusing apple fibre with infusion compositions by first extracting the sugars (from apple juice) in the CCE process as described above and creating a blank fibre. The blank fibre is fibre from the apple that has all sugars, oils and other soluble material removed. The blank fibre is then run through the CCI to infuse into the blank equal amounts of components that have been removed. These components are typically soluble, and may include sugars, oils, proteins, vitamins, minerals and polyphenols or combinations thereof.

By controlling the composition of the infusion liquor the CCI is able to ensure a controlled amount of the infusion liquor is infused back into the blank.

Apple Products

The process of the present invention thus allows creation of products by using 100% of the feedstock processed with no waste. A selection of products that can be produced from an apple include but are not limited to the following:

Bioactive Compounds (Polyphenols)

Polyphenols (phenolic compounds) are secondary compounds widely distributed in the plant kingdom. They are commonly found in both edible and non-edible plants, and have been reported to have multiple biological effects, including antioxidant activity. They are divided into several classes, i.e., flavonoids (flavones, flavonols, flavanols, flavanones, isoflavones, anthocyanidins), phenolic acids (hydroxybenzoic acids and hydroxycinnamic acids), stilbenes, and lignans, which are especially common in leaves, flowering tissues, and woody parts such as stems and barks.

Each of the specific bioactive compounds recovered from the apple feedstock, each of which has specific nutritional value merits. These bioactive compounds are incorporated into the production of healthy nutritional food and supplement products. The table below sites the bioactive compounds typically present in apple feedstocks:

TABLE 3

| Polyphenols (Phenolic Compounds) | Dietary Supplement | Nutraceutic | Cosmeceutic | Therapeutic | Pharmaceutic |
|---|---|---|---|---|---|
| Flavanols | | | | | |
| Quercetin | X | X | X | X | X |
| Quercetin-3-rutinoside | X | X | X | X | X |
| Quercetin-3-galactoside | X | X | X | X | X |
| Quercetin-3-glucoside | X | X | X | X | X |
| Quercetin-3-aribinoside | X | X | X | X | X |
| Quercetin-3-rhamnoside | X | X | X | X | X |
| Quercetin-3-glycoside | X | X | X | X | X |

TABLE 3-continued

| Polyphenols (Phenolic Compounds) | Dietary Supplement | Nutraceutic | Cosmeceutic | Therapeutic | Pharmaceutic |
|---|---|---|---|---|---|
| Flavones | | | | | |
| Apigenin | X | X | X | X | X |
| Flavanols | | | | | |
| Catechin | X | X | | | |
| Epicatechin | X | X | | | |
| Dihydrochalcones | | | | | |
| Phloretin | X | X | X | X | X |
| Phloridzin | X | X | X | X | X |
| Anthocyanidins | | | | | |
| Procyanidin B1 | X | X | | X | X |
| Procyanidin B2 | X | X | | X | X |
| Cyanidin 3-O-galactoside (Ideain) | X | X | | X | X |
| Phenolic Acids | | | | | |
| Hydroxycinnamic acids | | | | | |
| Caffeic acid | | X | X | | |
| Ferulic acid | | X | X | | |
| P-coumaric acid | | X | X | | |
| Chlorogenic acid | | X | X | | |
| Hydroxybenzoic acids | | | | | |
| Gallic acid | | X | X | | |
| Ellagic acid | | X | X | | |
| Vanillic acid | | | X | | |
| p-Hydroxybenzoic | | | X | | |
| Protocatechuic acid | | X | X | X | X |
| T-cinnamic acid | | X | X | | |

The CCE device of the present invention can be used to perform a feedstock processing step in the process for recovery of products from a feedstock according to the present invention. Alternatively, or in addition, the CCE device can be used to process feedstock from a prior art process. This may be done for a wide range of reasons, such as to maximise the economic aspects of processing, maximise yield or minimise waste, preferably eliminating waste.

For example, the CCE device may be retro-fitted to one or more existing feedstock processing plants to process a waste stream. The waste stream could be combined with fresh fruit, or other waste streams from other processing plants.

In another example, the CCE device may use feedstock directly derived from prior art processes. This may arise for example, in jurisdictions where the skin and peel of fruit and vegetables is prohibited by law from being used in production of a juice. This type of prohibition is applied to citrus processing in some countries. As such, the feedstock for the CCE would be supplied from a prior art squeeze or peel process, such as, by using a belt press.

Example 2—Sugar Cane Feedstock Processing

In the present example the feedstock comprises sugarcane. This example illustrates the separation of sugarcane biomass into valuable components such a (i) sucrose and (ii) bioenergy in the form of biofuels.

Initial Processing

Sugar cane is brought to the processing plant. If necessary, prior to transport to receiving bins, the billets are passed through a detrashing unit to remove leaf matter and loose organic matter, which may be subjected to further processing.

If necessary, the cane is conveyed from the detrashing unit to a washing station where dirt and other undesirable matter is washed from the outside of the cane. This maintains the quality of the processed material.

If the long stalk biomass in the form of cane stalks (billets) have not been cut to a desired length in the cane field they are cut to a desired length at the processing plant.

Cane Decortication

The typical next step in processing is decortication which separates the billets into three component parts, namely;

bark (2 wt %) which can be used as feedstock for extraction of tricin, and the extraction of other bioactive and waxes, hurd (80 wt %) which can be used as a feedstock for recovery of sugar and dietary fibre components, and bast (18 wt %) which can be used as the feedstock for recovery of cellulose and lignin for downstream energy generation.

Figure 12:
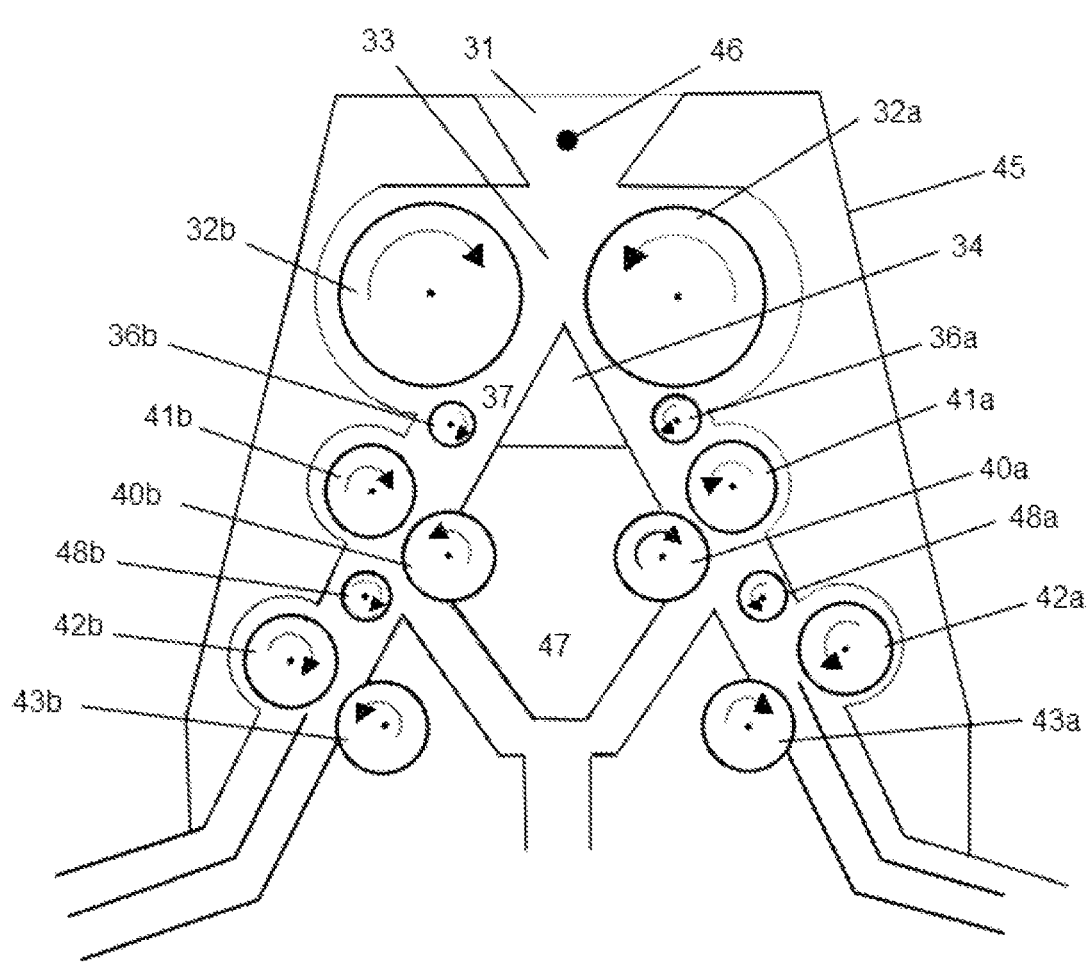
FIG. 12 is a plan diagram illustrating one embodiment of a decorticator suitable for use in the present invention.

FIG. 12 is a plan diagram illustrating one embodiment of a decorticator suitable for use according to the present invention. While the use of the decorticator is described with respect to sugar cane billets, it will be appreciated that the decorticator is suitable for use more generally with a wide range of plant biomass, typically in the form of long stalk plants.

The long stalk biomass is gravity fed into the decorticator through a funneled chute (31) that puts the stalks of the biomass into longitudinal alignment so that the stalks "pin drop".

The long stalks of biomass drop into a gripping area (33) between a pair of sizing wheels (32) that grip and squeeze the biomass feed stalks to a consistent predetermined diameter. The direction of rotation of the sizing wheels (32) are indicated by the curved arrows. The rotation of the sizing wheels (32) pushes the sized biomass feed at speed over a cutting head (34) attached to an inner frame (47) of the decorticator.

The cutting head (34) cuts the biomass feed stalks longitudinally, typically into two half stalks. The two halves of each travel down either side of the cutting head (34), guided by the inner passage (37) and first guide wheels (36). The direction of rotation of the first guide wheels (36) are indicated by the curved arrows. The biomass feed is thus guided into the first stage of decortication. The biomass feed continues down each side of the decorticator in 'mirror image' fashion.

1st Stage of Decortication

The first stage of decortication removes the hurd, or woody interior of the stalks. The biomass feed is then passed into the gap between a transport wheel (41) and adjacent cutting wheel (40). The biomass feed passes through a gap between the transport wheel (41) and adjacent cutting wheel (40).

The direction of rotation of each cutting wheel (40), the transport wheel (41) and the second guide wheels (48) are indicated by the curved arrows. The transport wheel (41) rotates slower than the cutting wheel (40) and thus grips the outer bark layer of the biomass feed stalks. The cutting wheel (40) removes the hurd on the underside of the biomass feed stalks. The size of the gap between the transport wheel (41) and the cutting wheel (40) dictates the proportion of hurd that is removed or remains on the outer bark layer of the biomass feed stalks.

The hurd that has been removed, is finely divided particulate matter that resembles saw dust and falls down an exit pipe to a conveyor belt (not shown). The hurd can be stored or fed directly to a downstream process (discussed below).

2nd Stage of Decortication

The biomass feed (minus at least part of the hurd) from the 1st stage of decortication, resembles long strips, and continues to the 2nd stage of decortication. The second stage targets the outer epidermal bark later for removal.

The biomass feed is passed into the gap between a second transport wheel (43) and adjacent second cutting wheel (42). The direction of rotation of the second transport wheel (43) and second cutting wheel (42) are indicated by the curved arrows. The second cutting wheel (42) rotates in the opposite direction to the first cutting wheel (40). Similarly, the second transport wheel (43) rotates in the opposite direction to the first transport wheel (41). The bark that is removed looks like sawdust and is extracted from the spinning second cutting wheel (42) by a pressurised stream of water or air. The bark falls down an exit pipe and onto a conveyor belt (not shown). The bark can be stored or fed directly to a downstream process (as discussed below).

Emerging from this processing is the bast, which looks like long fibrous straps. The bast product is pushed along an exit pipe.

In a preferred embodiment, the outer casing (45) of the decorticator is designed in a gull wing configuration that fits over the transport wheels and cutting wheels with a central pivot pin (46) at the top. The housing (45) can be rotated or pivoted about the pivot pin (46) to provide access to the interior of the decorticator for maintenance, safety inspections and configuration changes for new biomass processing, such as changing of the cutting head (34). The cutting head (34), cutting wheels (40, 42) and transport wheels (41, 43) are attached to an inner frame (47) of the decorticator which houses motors for rotating the wheels and gives the stability to the unit. All moving parts such as the cutting head (34) and transport wheels (41, 43) are removably attached to this frame. In a preferred embodiment the cutting knife (34) and transport wheels (41, 43) are "clipped on" to the inner frame (47) for easy removal for servicing and configuration changes.

Sugar Extraction from Hurd

The hurd generated from decortication may be fed into the CCE device where sugar is extracted using hot water as the diffusion liquid. The extracted sugar syrup has a Brix value of 10-11 and is subsequently passed through a vibrating sieve having a 0.5 mm screen to filter out larger solids.

Microfiltration

Microfiltration using 0.1 mm filter removes smaller solids and bacteria in the extract. The extracted sugar syrup can be sent for processing using a prior art sugar evaporator and crystallized to produce a superior plantation (unrefined) sugar. This simple process has the advantage that unlike conventional processes, it does not use any chemicals or other agents to clean or whiten the crystallized sugar.

If it is desired to further extract polyphenols and minerals from the sugar solution then the following steps may be utilised:

Ultrafiltration

Ultrafiltration can be used to remove the polyphenolic compounds and most of the extracted mineral salts from the retentate solution from the microfiltration. This provides a concentrate of polyphenols and minerals that can be further refined to make other products. The filtered extract can, from this stage, either be concentrated through evaporation and left as sugar syrup (see below) or used to produce sugar crystals.

Ion Exchange

An ion exchange process may optionally be used to further reduce any colour in the sugar solution. Ion exchange equipment such as resin exchange columns are well known in the art and can readily be included in a processing plant according to the present invention. Dark coloured polyphenolic compounds may be selectively removed by binding to a polymer exchange resin to produce a lighter product of superior appearance.

Evaporator

An evaporator is another device that is well known in the art and can be readily included in a processing plant. An evaporator creates conditions in which the sugar syrup can be crystallised by water evaporation from the syrup, typically to a level of greater than 70 brix. Water from the evaporation process can be recovered and used as a beverage, a beverage mixer or returned to the CCE for further sugar extraction.

Fiber from Hurd—for Human or Animal Consumption

Extracted fibre will exit the top of the CCE and pass into a cutting head such as a Comitrol® brand cutting head. The gauge on this cutting head may be set as required, such as to a desired fiber length.

The collected extracted fibre comprising approximately 85% moisture may be pumped into a balance tank, and then to a belt press where it is compressed to reduce the moisture level to approximately 70-75 wt %. The recovered water may be returned to the CCE device.

The pressed fibre can be fed to a rotary kiln dryer for further drying. Once dried to a moisture level of less than about 8%, the fibre can be milled and bagged. The water removed during drying, can be condensed and returned to the CCE, used in the plant for cleaning, or deployed for other uses such as agriculture.

Bark Processing

Bark processing is typically only used to target the recovery of specific products in the skin of the plant. If only sugar recovery is desired, or sugar and cogen energy, then it is not necessary to remove bark from the bast. Bark processing is an expensive process and is only economically viable for recovery of high value products, some of which are described in the following paragraphs.

Solvent Extraction Using Ethanol in CCE

Bark may be extracted in a CCE unit that is designed to be spark and flash proof. This is necessary because the extraction diffusion liquid comprises ethanol diluted to 18% in water in order to extract bioactives in the skin that are not water soluble. These include tricin, polyphenols and lipids in the bark that have considerable commercial value. The extract is screened through a 1 mm sieve to remove larger solids.

An evaporator is used to remove the ethanol and water to concentrate the bioactive compounds in the extract. The water and ethanol removed by evaporation can be condensed and used for other purposes.

Hurd & Bark Processing for Energy after Extraction

Both the hurd and the bark are suitable for processing into energy after the extraction of sugar from the hurd and polyphenols from the bark. For example, the hurd and bark biomass may be processed into pellets and then dried to the desired moisture content. As illustrated in the process steps shown in FIG. 11 the recovered fibre may be processed into pellets, dried and then used to produce gas for power generation. High temperature pyrolysis of the dried pellets forms a syngas rich in hydrogen and carbon monoxide which is then filtered. Biochar and graphene are produced by pyrolysis of the biomass and are removed and can be used for purposes such as soil amendment.

Bast & Bark Processing for Energy—Ethanol, Biodiesel and Hydrogen

The above described process can also be used for bast and bark, or bast alone. The bast is typically cutter to a desired length and processed into dried pellets (38) for conversion in the reaction steps illustrated in FIG. 11. If there is need to dry the biomass further it can be put into long term storage before processing.

The removal of the bark is preferred to avoid extraction of waxes that can cause undesirable by-products in the process. As the waxes do have commercial value, they are considered a waste stream if their removal is required.

The biomass is moved to balance tanks where an enzyme is added to further 'loosen' the targets in the fiber. Liquid targets are lignin and cellulose for the creation of bioethanol, fibers for pyrolysis to create biodiesel, wood vinegar, biochar and thermal energy. The balance tanks steady the rate of feed of the biomass into the CCE device where the fibers are separated from the lignin and cellulose materials.

Liquids

The liquid stream is a mix of cellulose, lignin and water. The liquid passes through a coarse filter to remove any expired enzymes, before the water is separated from the lignin and the cellulose using any convenient means, such as centrifuging or membrane filtration. Depending on whether ethanol is desired, the mixed stream can directly be fed to a process, or the liquid is separated into a lignin and cellulose stream for further refining into ethanol/bioenergy.

Example 3—Hemp/Kenaf Processing

In the present example the feedstock comprises a high fibre product such as hemp or kenaf. This example illustrates the separation of hemp or kenaf biomass into valuable components such a (i) energy in the form of biofuels, (ii) cotton alternatives and (iii) plant based proteins for human or animal consumption.

Initial Processing

Hemp stalk is brought to the processing plant. If the stalks have not been cut to a desired length in the cane field, they are cut to a desired length at the processing plant.

If necessary, prior to transport to receiving bins, the stalks are passed through a detrashing unit to remove leaf matter and loose organic matter, which is passed into a separate process for second stage re-use in animal feed.

If necessary, the stalks are conveyed from the detrashing unit to a washing station where dirt and other undesirable matter is washed from the outside of the stalks. This maintains the quality of the processed material.

Stalk Decortication

The stalks are accelerated through the machine to split the cane into 3 different parts, namely;

2 wt % bark (which is removed from the bast is if the bast needs to be of high purity) and is used in producing energy or for the extraction of high end bioactives, 60-70 wt % hurd which contains short fibre, the majority of the lignin and lower cellulose and is used for bonding in hempcrete, and for energy production, and 30-40 wt % bast which has the majority of long fibre strands is high in cellulose, low in lignin and is used primarily for textiles and energy production.

Hurd Processing

Figure 11:
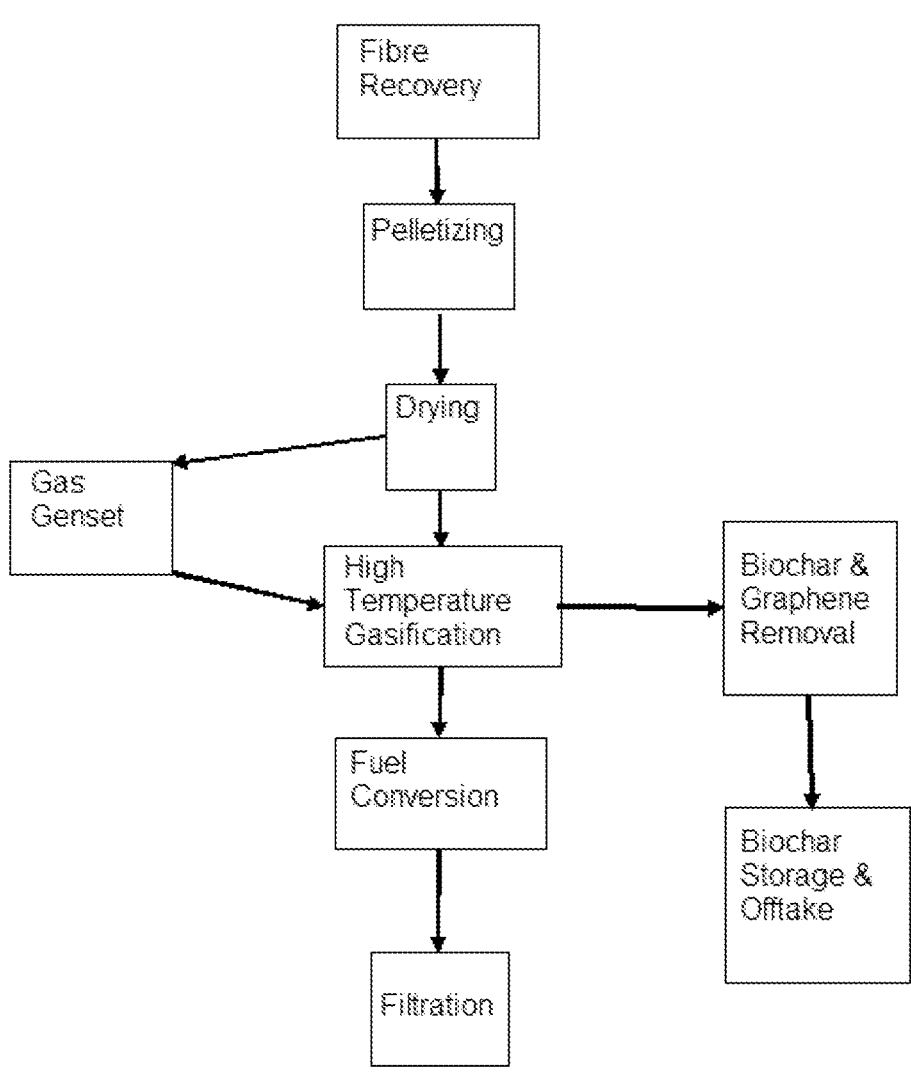
FIG. 11 is a flow chart illustrating the use of fibre, produced by any of the processes disclosed herein, as feedstock for the production of energy and synthetic fuel.

If energy is the only desired output from the hurd then the removed material is moved to a pelletising unit and then a drying unit where the moisture will be reduced to 14%. The pellets can then be used for energy generation as illustrated in FIG. 11.

Alternatively, if the hurd is to be subjected to extraction, it is sent on conveyor belts to the CCE device and extracted using hot or cold water as the diffusion liquid. The extracted liquid may contain cellulose, lignin, starch, proteins and sugars.

Secondary processing of these extracts can be based on the desired economic outcome such as liquid starches, proteins, sugars and energy conversions for the cellulose and lignin.

Fiber Processing

The extracted fibre described above can exit the top of the CCE and be fed into a belt press for moisture removal. The extracted fiber is approximately 85% moisture and may be pressed to reduce the moisture content to approximately 70-75%. The recovered water can be returned to the CCE.

The pressed fiber may be pelletized and sent for further drying. Once dried to a moisture level of 14% moisture, the fibre can be stored for later energy conversion. The water removed by the drying, can be condensed and reused in the CCE, used in the processing plant for cleaning, or deployed for other uses including agriculture.

Bark Processing

Bark processing is only required when specific high value polyphenol products in the skin of the plant are desired, or for cleaning the bast for conversion to textiles. If energy recovery is the sole target, then bark is not required to be removed from the bast. This is an expensive process and is only worthwhile for recovery of high value products.

Solvent Extraction Using Ethanol in CCE

The bark layer is extracted in a CCE device that is designed to be spark and flash proof due to the use of flammable extraction diffusion liquid, such as 18% aqueous ethanol solution. Ethanol is used to extract the bioactives in the bark that are not water soluble such as tricin and other lipids that have considerable commercial value. The extract is screened through a 1 mm sieve before being concentrated in the evaporator.

An evaporator is used to remove the solvent and to concentrate the bioactive compounds in the extract. The solvent can be retrieved and reused. The concentrate is then sent for further extraction of the relevant bioactives.

The remaining fibre is pressed and pelletized and dried to 14% moisture for storage. It may be used for example, in the energy conversion process illustrated in FIG. 11.

Bast Processing for Textiles:

Regardless of whether the bark is removed by the decorticator, processing of the bast is the same as described above. The bast is cut to a length suitable for the CCE device in which it is to be processed, and to achieve the desired length of processed fibres. The cut bast is then moved to a ballast tank containing an enzyme to help loosen the fibers and degum the bast. The type of enzyme will be determined by the amount of extraction required and the optimal amount of breakdown of the fiber strands. As they pass through the CCE the fibre strands loosen and release a liquid stream containing cellulose, lignin, sugars and starches. These extracts can be moved to secondary separation processes and processes for conversion to energy.

Liquids

The liquid stream is a mix of cellulose, lignin, starch and water. The liquid is passed through a course filter to remove any expired enzymes, before the water is separated from the lignin and the cellulose using any convenient means, such as centrifuging or membrane filtration. Depending on whether the generation of ethanol is desired either the mixed stream can be processed, or the liquid can be separated into a lignin and cellulose stream for further refining into ethanol/bioenergy.

Once removed from the end of the CCE, the fibers are ready for drying and processing into alternative cotton, paper, cardboard or any number of textile based materials.

Bast Processing for Energy

Regardless of whether the hurd is removed from the bast by the decorticator, processing of the bast is the same as described above. The bast is cut to the desired length and dried to 14% moisture for storage and conversion to energy.

Pelletized Biomass for Energy Conversion

The pelletized biomass is optimally feed in a system such as that depicted in FIG. 11. The biomass can be converted, for example, into:

Renewable Fuels—diesel, avgas, ethanol and hydrogen

Biochar/graphene

Pyroligneous Acid

Water

In general, the pelletized biomass may be used in most types of prior art pyrolysis processes, with varying degrees of yield and product quality.

Liquid Conversion to Energy

Various other valuable products in the biomass can be extracted (such as by using CCE) or separated (such as by using decortication) before the biomass is turned into energy. One of the advantages of the process of the present invention is that it provides biomass-to-energy conversion without the need for removal of undesirable by-products or impurities to improve the biomass conversion. This is true for a wide range of biomass feedstocks including sugarcane, and oils derived from feedstocks such as palms.

Discussion of the Examples

The Examples illustrate an embodiment of the invention in which a decorticator and/or counter current extraction device can be used for isolating products from a feedstock With particular reference to Example 2 and Example 3, the present invention provides a system for processing a feedstock comprising the steps of:

(i) passing the feedstock through a decorticator to separate the feedstock into bast, hurd and bark;

(ii) further individually processing at least one of the bast, hurd and bark in a counter current extractor, wherein the bast is pressed, dried and stored, and/or wherein the hurd and/or bark is pressed, dried and pyrolyzed to produce one or more of tar, wood vinegar (pyroligneous acid), hydrogen and biochar.

Figure 13:
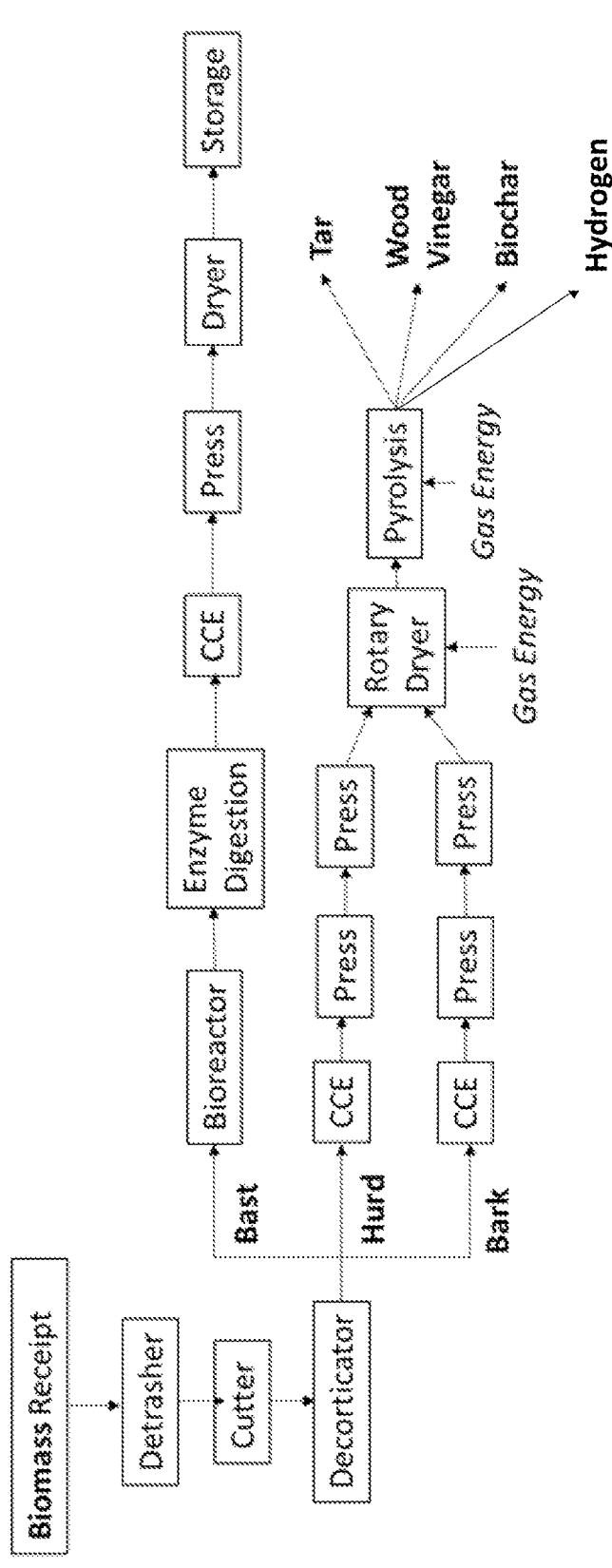
FIG. 13 is a flow chart illustrating a further embodiment of a process according to the present invention for processing a feedstock to separate or extract products.

This system is described in more detail in FIG. 13, including steps intermediate to counter current extraction and decortication.

One of ordinary skill in the art will appreciate that materials and methods, other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by examples, preferred embodiments and optional features, modification and variation of the concepts herein disclosed may be resorted to by those skilled in the art, and that such modifications and variations are considered to be within the scope of this invention as defined by the appended claims.

Each of the references cited herein is incorporated by reference herein in their entirety. Such references may provide sources of materials, alternative materials, details of methods, as well as additional uses of the invention.

Further scope of applicability of embodiments of the present invention will become apparent from the detailed description given herein. However, it should be understood that the description and specific examples, while indicating preferred embodiments of the invention, are given by way of illustration only, since various changes and modifications within the spirit and scope of the disclosure herein will become apparent to those skilled in the art from this detailed description.

It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer and for that matter, any commercial processor may be used to implement the embodiments of the invention either as a single processor, serial or parallel set of processors in the system and, as such, examples of commercial processors include, but are not limited to Merced™, Pentium™, Pentium II™, Xeon™, Celeron™, Pentium Pro™, Efficeon™, Athlon™, AMD™ and the like), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML. Moreover, there are hundreds of available computer languages that may be used to implement embodiments of the invention, among the more common being Ada; Algol; APL; awk; Basic; C; C++; Conol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; Linux and XML.) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). Hardware logic may also be incorporated into display screens for implementing embodiments of the invention and which may be segmented display screens, analogue display screens, digital display screens, CRTs, LED screens, Plasma screens, liquid crystal diode screen, and the like.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analogue technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. The broad term "comprising" is intended to encompass the narrower "consisting essentially of" and the even narrower "consisting of." Thus, in any recitation herein of a phrase "comprising one or more claim element" (e.g., "comprising A), the phrase is intended to encompass the narrower, for example, "consisting essentially of A" and "consisting of A" Thus, the broader word "comprising" is intended to provide specific support in each use herein for either "consisting essentially of" or "consisting of." The invention illustratively described herein suitably may be practiced in the absence of any element or elements, limitation or limitations which is not specifically disclosed herein.

The invention claimed is:

1. A method for recovery of products from a feedstock, the process comprising the steps of:

receiving a feedstock;

recording a feedstock profile in a database stored in computer memory associated with a computer processor in communication with an apparatus for separating the feedstock into components, the apparatus comprising a decorticator;

preloading a recipe program on the computer memory associated with the processor, the recipe program including machine readable recipe program instructions for process control settings;

providing, via multiple sensors, real-time feedstock information to the computer processor for optimization of the pre-loaded recipe program for separating the feedstock into components; and separating the feedstock into components, according to the machine readable recipe program instructions executed by the computer processor, the instructions being based on the feedstock profile and the real-time feedstock information;

performing real-time adjustment of the machine-readable recipe program instructions executed by the processor by dynamically modifying, in real-time, one or more process control command instructions related to operation of the apparatus for separating the feedstock into components, based on the feedstock profile, the real-time feedstock information, or a combination thereof; and wherein the components separated include hurd, bark, and bast.

2. The method according to claim 1, further comprising washing the feedstock, by:

providing an electrolysis cell having a single cell containing an anode and a cathode and brine electrolyte, passing an electric current from the cathode to the anode to produce a free chlorine solution including HOCl wherein the solution pH is between 5 and 7, and applying the solution to the feedstock.

3. The method according to claim 1, wherein:

an Efficiency Digital Algorithm calculates adjustments to be applied to the machine readable recipe program instructions based on the profile, the feedstock information, or a combination thereof; and the adjusted machine readable recipe program instructions are applied to the process control settings.

4. A system for performing a recovery of products from a feedstock according to the method of claim 1, the system comprising:

a feedstock processing arrangement operable to perform a number of feedstock processing steps according to the recipe program;

the apparatus in communication with the feedstock processing arrangement and configured for process control of the feedstock processing steps; and multiple sensors associated with the feedstock processing arrangement and adapted to transmit the feedstock profile and the real-time feedstock information to the apparatus;

the apparatus comprising:

the computer memory for storing the recipe program that comprises a list of the machine readable recipe program instructions for the process control settings associated with the feedstock processing steps, the list of the machine readable recipe program instructions comprising one or more process control command instructions, each process control command instruction comprising an allocation of a respective feedstock processing step to a predefined control command among a set of predefined control commands;

an electronic warehouse comprising the database for storing the feedstock profile and the real-time feedstock information;

the computer processor for performing real-time adjustments of the machine readable recipe program instructions in response to the feedstock profile and the real-time feedstock information from the database;

wherein the processor is configured to process the feedstock profile and the real-time feedstock information as inputs to an Efficiency Digital Algorithm for calculation of the real-time adjustments to the machine readable recipe program instructions and optimization of the process control command instructions, prior to sequentially executing the machine readable recipe program instructions in the list of instructions.

5. The method according to claim 1, further comprising separating the feedstock into components using a device for counter current diffusion extraction, the device for counter current diffusion extraction comprising:

an elongate housing having an inlet adjacent a first end and an outlet adjacent a second end, a longitudinal axis of the housing being inclined upwardly from the first end to the second end;

a rotatable screw conveyor having at least one substantially helical flight disposed within the housing and rotatable about the longitudinal axis for continuously moving the feedstock to be extracted from the inlet to the outlet;

an airlock chamber located adjacent the inlet, the airlock chamber comprising an openable top side for receiving the feedstock from the inlet and an openable floor for dispensing the feedstock to the rotatable screw conveyor;

means for introducing an extracting liquid into the housing such that the extracting liquid flows down the housing and in counter current with the feedstock being extracted;

means for withdrawing liquid extracted from the feedstock and returning the liquid into the housing such that the returned liquid contacts the feedstock being extracted;

a pump for reducing pressure within the housing; and wherein the rotatable screw conveyor includes one or more screw lifters to bring the returned liquid into contact with the feedstock being extracted.

6. The method according to claim 1, wherein two or more of the products recovered from the feedstock are combined or re-combined by counter current infusion.

7. A decorticator for deriving products from a feedstock, the decorticator comprising:

a pair of rotating sizing members adapted to size the feedstock passed therebetween, a cutting head for cutting the feedstock, a first rotating cutting member for removing a first product comprising hurd from the feedstock, a second rotating cutting member for removing a second product comprising bark from the feedstock, wherein a remaining third product comprises bast, and separate outlets for each of the first product, the second product and the third product.

8. The method according to claim 1, wherein the decorticator comprises:

a pair of rotating sizing members adapted to size the feedstock passed therebetween, a cutting head for cutting the feedstock, a first rotating cutting member for removing a first product comprising hurd from the feedstock, a second rotating cutting member for removing a second product comprising bark from the feedstock, wherein a remaining third product comprises bast, and separate outlets for each of the first product, the second product and the third product.

9. A system for recovery of products from a feedstock, comprising:

a decorticator operable to perform a number of feedstock decortication steps according to a program, the decorticator comprising a first rotating cutting member for removing a first product comprising hurd from the feedstock, a second rotating cutting member for removing a second product comprising bark from the feedstock, an apparatus which is in communication with the decorticator and configured for process control of the feedstock processing steps, and multiple sensors associated with the decorticator and adapted to transmit decorticator information and feedstock information to the apparatus, the apparatus comprising:

a memory unit for storing a feedstock decortication program that comprises a list of machine-readable feedstock decortication program instructions for process control of the feedstock decortication steps, the list of machine-readable feedstock decortication program instructions comprising one or more process control command instructions, each process control command instruction comprising an allocation of a respective feedstock decortication step to a predefined control command among a set of predefined control commands, an electronic warehouse comprising databases for storing the decorticator information and the feedstock information, a processor for performing real-time adjustment of the machine-readable feedstock decortication program instructions in response to the decorticator information and the feedstock information from the databases, wherein the processor is configured to process the decorticator information and the feedstock information as inputs to an Efficiency Digital Algorithm for calculation of the adjustments to the machine-readable feedstock decortication instructions and optimization of the process control command instructions, prior to sequentially executing the machine-readable feedstock decortication program instructions in the list of instructions.

10. The system of claim 9, further comprising a counter current diffusion device, wherein the decorticator produces one or more of bark, hurd or bast as the feedstock for the counter current diffusion device.

11. A system for processing a feedstock, the system comprising a decorticator, a counter current extractor, a press and a dryer, the decorticator comprising:

a pair of rotating sizing members adapted to size the feedstock passed therebetween, a cutting head for cutting the feedstock, a first rotating cutting member for removing a first product comprising hurd from the feedstock, a second rotating cutting member for removing a second product comprising bark from the feedstock, wherein a remaining third product comprises bast, and separate outlets for each of the first product, the second product and the third product;

the counter current extractor comprising:

an elongate housing having an inlet adjacent a first end and an outlet adjacent a second end, a longitudinal axis of the housing being inclined upwardly from the first end to the second end;

a rotatable screw conveyor having at least one substantially helical flight disposed within the housing and rotatable about the longitudinal axis for moving a feedstock to be extracted from the inlet to the outlet;

means for introducing an extracting liquid into the housing such that the extracting liquid flows down the housing and in counter current with the feedstock being extracted;

means for withdrawing liquid extracted from the feedstock and returning the liquid into the housing such that the returned liquid contacts the feedstock being extracted;

a pump for reducing pressure within the housing; and
an airlock chamber located adjacent the inlet such that
the feedstock to be extracted can be introduced
through the inlet to the rotatable screw conveyor;
wherein the system is configured to:
   (i) pass the feedstock through the decorticator to separate
   the feedstock into bast, hurd and bark;
and
   (ii) pass at least one of the bast, hurd and bark through the
   counter current extractor, the press and the dryer.
   12. The system according to claim 11, wherein the system
is further configured to pyrolyze one or both of the hurd and
bark to produce one or more of tar, wood vinegar (pyrolig-
neous acid), hydrogen and biochar.
   13. The system of claim 10, wherein the counter current
diffusion device comprises:
   an elongate housing having an inlet adjacent a first end
   and an outlet adjacent a second end, a longitudinal axis
   of the housing being inclined upwardly from the first
   end to the second end;
   a rotatable screw conveyor having at least one substan-
   tially helical flight disposed within the housing and
   rotatable about the longitudinal axis for moving a
   feedstock to be extracted from the inlet to the outlet;
   means for introducing an extracting liquid into the hous-
   ing such that the extracting liquid flows down the
   housing and in counter current with the feedstock being
   extracted;
   a means for withdrawing liquid extracted from the feed-
   stock and returning the liquid into the housing such that
   the returned liquid contacts the feedstock being
   extracted;
   a pump for reducing pressure within the housing; and
   an airlock chamber located adjacent the inlet such that the
   feedstock to be extracted can be introduced through the
   inlet to the rotatable screw conveyor.

14. The method of claim 8, wherein the feedstock is
separated into components using a device for counter current
diffusion extraction, the device for counter current diffusion
extraction comprising:
   an elongate housing having an inlet adjacent a first end
   and an outlet adjacent a second end, a longitudinal axis
   of the housing being inclined upwardly from the first
   end to the second end;
   a rotatable screw conveyor having at least one substan-
   tially helical flight disposed within the housing and
   rotatable about the longitudinal axis for moving a
   feedstock to be extracted from the inlet to the outlet;
   means for introducing an extracting liquid into the hous-
   ing such that the extracting liquid flows down the
   housing and in counter current with the feedstock being
   extracted;
   means for withdrawing liquid extracted from the feed-
   stock and returning the liquid into the housing such that
   the returned liquid contacts the feedstock being
   extracted;
   a pump for reducing pressure within the housing; and
   an airlock chamber located adjacent the inlet such that the
   feedstock to be extracted can be introduced through the
   inlet to the rotatable screw conveyor, the process com-
   prising the steps of:
   (i) passing the feedstock through the decorticator to
   separate the feedstock into bast,
   hurd and bark; and
   (ii) passing at least one of the bast, hurd and bark through
   the counter current extractor, a press, and a dryer.
   15. The method of claim 14, further comprising pyrolyz-
ing one or both of the hurd and bark to produce one or more
of tar, wood vinegar (pyroligneous acid), hydrogen and
biochar.

* * * * *